United States Patent [19]
Hansen

[11] Patent Number: 5,394,322
[45] Date of Patent: Feb. 28, 1995

[54] SELF-TUNING CONTROLLER THAT EXTRACTS PROCESS MODEL CHARACTERISTICS

[75] Inventor: Peter D. Hansen, Wellesley Hills, Mass.

[73] Assignee: The Foxboro Company, Foxboro, Mass.

[21] Appl. No.: 96,600

[22] Filed: Jul. 22, 1993

Related U.S. Application Data

[63] Continuation-in-part of Ser. No. 553,915, Jul. 16, 1990.

[51] Int. Cl.⁶ .............................................. G05B 13/04
[52] U.S. Cl. ..................... 364/148; 364/151; 364/152; 364/157; 364/162
[58] Field of Search ..................... 364/148–152, 364/160–165, 157; 318/561

[56] References Cited

U.S. PATENT DOCUMENTS

| | | | |
|---|---|---|---|
| Re. 33,267 | 7/1990 | Krauss | 364/148 |
| 3,798,426 | 3/1974 | Bristol, II . | |
| 4,335,438 | 6/1982 | Smolen | 364/162 |
| 4,578,747 | 3/1986 | Hideg et al. | 364/151 |
| 4,602,326 | 7/1986 | Kraus | 364/148 |
| 4,674,029 | 6/1987 | Maudal | 364/148 |
| 4,855,897 | 8/1989 | Shinskey . | |
| 4,864,490 | 9/1989 | Nomoto et al. . | |
| 4,879,643 | 11/1989 | Chakravarty et al. | 364/148 |
| 4,903,192 | 2/1990 | Saito et al. . | |
| 5,029,066 | 7/1991 | Hiroi . | |
| 5,043,862 | 8/1991 | Takahashi et al. . | |
| 5,121,332 | 6/1992 | Balakrishnan et al. | 364/151 |
| 5,124,626 | 6/1992 | Thoen | 364/162 |
| 5,166,873 | 11/1992 | Takatsu et al. . | |

FOREIGN PATENT DOCUMENTS 860191141 7/1988 Japan .
880066523 12/1989 Japan .

OTHER PUBLICATIONS

Radke, F., Microprocessor-based Adaptive PID-Controllers, *ISA Transactions* 27:2 (1988), 43–50.
DaSilva, M., et al., A Rule Based Procedure for Selftuning PID Controllers, *Proc. 27th IEEE Conf.* on Decision and Control, vol. 313 (Dec. 1988), pp. 1947–1951.

*Primary Examiner*—Roy N. Envall, Jr.
*Assistant Examiner*—Thomas E. Brown
*Attorney, Agent, or Firm*—Lahive & Cockfield

[57] ABSTRACT

An apparatus and method for process control that extracts information from a process for developing a model of the process that is used to design system control. The apparatus includes means for selecting a process model form that has two or more selectable parameters. The apparatus also includes means for deliberately disturbing a process that is in open-loop operation and that is in a substantially settled state and further includes means for measuring the process response. The apparatus selects parameters for the process model form according to a function of the measured process response. In this way a complete model of the process is identified. The apparatus self-tunes by directly calculating new control parameters according to a function of the identified open-loop process model and a preselected target behavior.

24 Claims, 8 Drawing Sheets

SELF-TUNING CONTROLLER THAT EXTRACTS PROCESS MODEL CHARACTERISTICS

This application is a continuation-in-part of the pending commonly assigned and U.S. application Ser. No. 07/553,915, filed Jul. 16, 1990.

REFERENCE TO RELATED APPLICATION

This application is related following to the commonly assigned application, filed the same day herewith.

U.S. patent application No. 08/096,599, for AN IMPROVED SELF-TUNING CONTROLLER.

The teachings of the above-cited applications are incorporated herein by reference.

1. Field of the Invention

This invention relates to self-tuning adaptive controllers for controlling a process and more particularly to model identification self-tuning controllers.

2. Background of the Invention

Process control refers to a methodology for controlling the operational parameters of a process by monitoring one or more of its characteristics over time. It is used to ensure that the quality and the efficiency of a process do not vary substantially during a single run or over the course of several runs. While process control is typically employed in the manufacturing sector, it also has application in service industries.

A process control unit, or "controller," typically operates by comparing values of a process characteristic—referred to as the controlled variable—with a target value to determine whether the process is operating within acceptable bounds. For example, in a process in which fluid flows at a constant rate from a tank that is continuously filled to constant volume, a controller monitors the liquid level and, if necessary to prevent the tank from running dry or overflowing, adjusts an inlet valve to increase or restrict inflow to the tank.

A self-tuning controller is a particular type of controller that provides adaptable control of processes. Generally, this adaption is accomplished by monitoring the responsiveness of the presently configured control system, and subsequently reconfiguring the controller based on the observed system behavior under the prior controller configuration. A number of adaptive control schemes exist for determining how to reconfigure the controller. A first technique monitors a closed-loop variable signal and identifies certain pattern features of the signal, such as the signal overshoot, and the signal decay. The controller compares these measured characteristics against a set of desired characteristics. The controller then generates new control parameters for adjusting the controller according to the requirements of the process in order to achieve a response that has the desired characteristics. This performance feedback scheme reconfigures the controller to achieve preselected pattern features for the monitored closed-loop variable signal. Although the performance feedback technique generally functions well, it has two inherent limitations. A first limitation is that the controller is sensitive to the type of disturbance affecting the system. This is an inherent limitation because the pattern features of the response are related to the disturbance type. A second limitation is that the pattern features of the response do not have a direct analytical relation to the characteristic behavior of the process. This generally requires performance-feedback controllers to rely extensively on experimental data and expert system rules in order to adapt the control. These experimental techniques are not generally understood to provide a computational procedure for determining complete information about the characteristic behavior of the process.

An alternative adaptive control scheme has been postulated, which uses a model of the process being controlled. The general theory of model feedback is that once a model of the process can be identified, a controller can be configured that has an optimum structure for that process. The model based approach depends on an accurate match between the actual process and the process model. One factor effecting this match is the manner in which the model is represented and manipulated. Prior techniques have used discrete model forms and discrete manipulation to adapt the controller. Discrete (finite difference) models are inherently limited in their ability to represent analog linear systems. Even so, the model based approach has many advantages. Correctly done, this model based approach substantially optimizes system control.

However, even with an accurate model, the controller must be adjusted to accommodate the characteristics of the specific process under control. Prior continuous differential equation model identification techniques have deliberately disturbed the process to identify process parameters such as the primary time constant (which reflects the rate at which the process responds to changes in input), and gain (which reflects the magnitude of response). These prior techniques estimate the process parameters by analyzing the physical characteristics of the response that relate to the process parameters. These estimates are based on empirically determined rules that relate the physical characteristics under analysis to a particular process parameter. This and related techniques for determining process characteristics by monitoring the process response are generally quite effective. Nevertheless, a more analytical approach for determining the process parameters would provide more accurate control.

A difficulty with present model control relates to selecting suitable criterion for adapting the control parameters according to the identified model. Present techniques select set point criterion, such as minimizing the absolute integrated error, that provide good set point tracking but often cause very slow recovery for certain process types. Consequently, present model-feedback control may not adequately reject an unmeasured load disturbances when the process is of a certain type, such as a dominant lag.

SUMMARY OF THE INVENTION

It is an object of the present invention to provide a self-tuning controller that has means to deliberately disturb a process operated in open-loop mode in order to extract substantially complete information about the characteristic behavior of the process.

It is a further object of the present invention to provide an adaptor that analytically determines directly from a process model a set of controller parameters, wherein these controller parameters improve the tuning of the control system.

It is a further object of the present invention to provide an adaptor that substantially represents an open-loop process model as a differential equation written in operator polynomial form.

It is a further object of the present invention to provide a self-tuning controller that has an adapter that selects a process model form that has one or more selectable parameters, and that has means for selecting these parameters from observations of the characteristic behavior of the process.

It is a further object of the present invention to provide an adaptor that has means for storing a target behavior that represents desired controller behavior, wherein the target behavior is represented as a transfer equation having two or more unknown parameters and the adaptor has means for determining the values of these unknown parameters.

It is a further object of the present invention to provide an improved self-tuning controller that employs a tuning method that allows the tuning of controller constants and closed-loop performance measures.

It is a further object of the present invention to provide a self-tuning controller that has a tuning method for calculating controller parameters directly from a model of an open-loop process and a selected target behavior, wherein the process model is written as a differential equation.

It is a further object of the present invention to provide a self-tuning controller that has an adaptor that determines a partial identification of the open-loop process, and the process model according to this partial identification..

In general, the invention features a self-tuning controller that is connected to a process. The controller operates to monitor and to adjust the process so that selected operational parameters are maintained within acceptable ranges. In one aspect of the invention, the controller adapts the tuning of the control system by first building a model of the process and then generating new control parameters that are selected so that the controller and the process interact in such a way that the control system has a selected characteristic behavior. To this end, the controller first selects a process model form such as four parameter two-lag delay model. Generally, this process model is represented as a factored polynomial with one independent variable and a preselected number of parameters. The four parameters of this process model are: the gain, the primary lag, the secondary lag, and the delay time and the independent variable is s. These process parameters are determined by having the controller actuate the process operated in open-loop mode and having the controller measure the process response. The controller then calculates the four process parameters for a two-lag delay model that would cause the measured response. In this way a complete process model is identified and the identified model is represented as a differential equation In a further aspect of the present invention, the controller generates new controller parameters directly from the identified process model. The controller selects a target behavior for the control system and generates new controller parameters according to a function of the selected target behavior and the process model written in the form of an unfactored polynomial. A realization of the present invention is that target loop behavior can be selected to provide both good load disturbance rejection and good set-point tracking.

In accordance with a further aspect of the invention, a closed-loop control system is subdivided by the controller into a series of sub-processes, and each sub-process has a selected target behavior. To this end, the controller has means for tuning the control system as a series of cascaded control loops. In accordance with a further aspect of the present invention, the controller has an adaptor that builds a partial model of the process.

As in the manner described above, the controller adapts the tuning of the control system according to this partial process model.

BRIEF DESCRIPTION OF THE DRAWINGS

The foregoing and other objects, features, and advantages of the invention will be apparent from the following more particular description of the preferred embodiment of the invention, as illustrated in the accompanying drawings in which like reference characters refer to the same parts throughout the different views.

DETAILED DESCRIPTION OF THE APPLICATION

Figure 1:
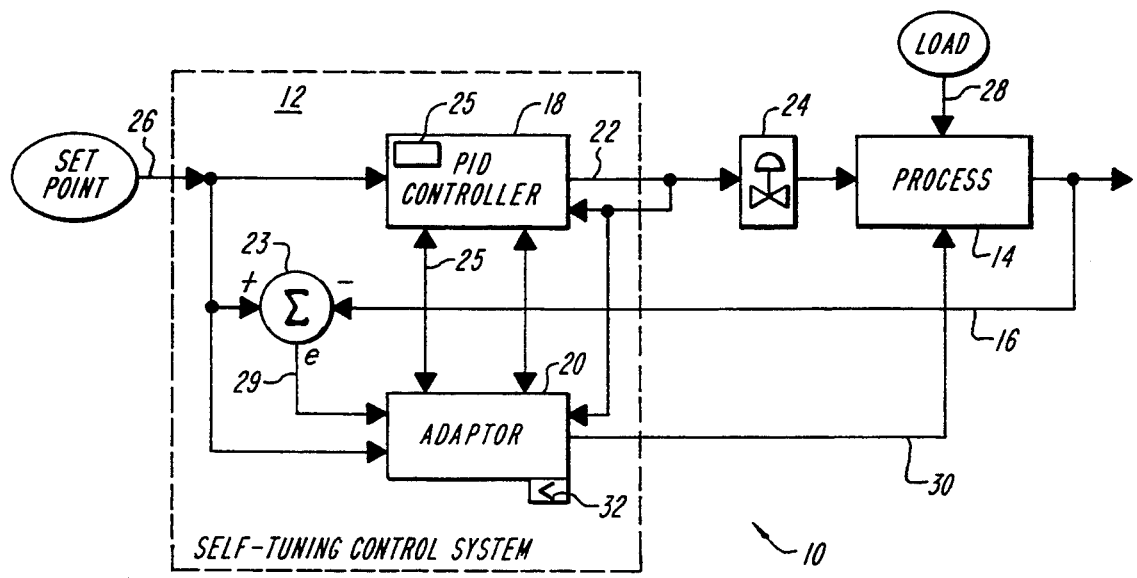
FIG. 1 is a block diagram of an adaptive process control system according to the present invention.

The present invention is constructed to identify a model of the process under control and to generate the controller parameters by directly computing, by algebraic tuning, the parameters from the identified process model. The present invention is further constructed to adaptively tune the control system by monitoring a closed-loop response of the control system partially identifying the present structure of the process. As the process structure alters, the controller adapts the process model, and generates new tuning parameters directly from the updated model.

To this end, the present invention uses pretuning and partial process identification to identify a process model for adapting controller parameters to substantially achieve a selected target behavior. Pretuning is a procedure that builds a complete model of the process under control. Generally, pretuning builds the model by first selecting a model form, such as a two-lag delay model. The model for the two-lag delay is generally given as:

$$Co(1+t_1s)(1+t_2s)e^{-\tau ds}$$

where Co represents the process gain, $\tau_1$ represents the primary process lag, $\tau_2$ represents the secondary process lag and $\tau d$ represents the process dead-time. As will be explained in greater detail herein after, the selected model form can be preselected before pretuning beings, or adaptively selected according to predefined design criteria during the pre-tune process. As is apparent from the above description, the model form is a mathematical equation that represents the general behavior, (i.e., the process response time or its gain according to operation frequency) of the open-loop two-lag delay process. In order to represent the particular process that is presently connected to the controller, the pre-tune procedure identifies the four process parameters that uniquely relate to that process. In this way, the pre-tune procedure builds a complete model for the process presently under control.

Partial process identification is similar to pre-tune except that the partial process model technique does not identify as many behavior characteristics of the process. This means the model is less complete. However, the partial model method has the advantage of identifying a process model from the closed-loop response of the control system. In other words, during system operation. This and other features of the partial process model method and apparatus are more fully described in the co-pending U.S. application Ser. No. 08/096,599, previously referenced.

In order to identify the model parameters, the controller actuates the process when the process is in an open-loop mode, and substantially settled. In one embodiment, the controller has a switch that a user can activate to decouple the control signal from the process and allow the process to operate in open-loop mode. The open-loop process response is measured to determine the amplitudes of the peaks and the times at which the response crosses a threshold value and when the response reaches a peak value. These measured values identify the particular process model parameters that represent the process presently operated in an open-loop mode.

Furthermore, the present invention translates the open-loop process model into an all-denominator form, and then generates parameters for the controller according to a target loop behavior. These parameters are implemented within the controller to substantially achieve the desired loop behavior.

Referring to FIG. 1, an adaptive process control system 10 includes a self-tuning control system 12 and a process 14 that is characterized by a controlled process variable 16, such as temperature, pressure or concentration. The self-tuning control system 12 consists of a controller 18 that has at least one tunable control parameter 25, an adaptor 20 for automatically adjusting or tuning the control parameters of the controller 18 to optimize the general behavior of the closed-loop system 10, and an actuating signal 30 for actuating the process. In the illustrated embodiment, the adaptor 20 includes a switch 32 that couples the controller 18 to the process 14. When the switch 32 is in the coupled position, the controller connects to the process and the control system 10 is operated in closed-loop mode. When the switch 32 is in the decoupled position, the controller 12 decouples the control signal 22 connected to valve 24, and the process 14 is operated in open-loop mode. It should be apparent to one skilled in the art of controller design that the switch 32 could be implemented as a software control or by other generally known techniques. Generally, the pretune process actuates the process 14, through signal 30 when the switch 32 decouples the controller 12 from the process 14. As further illustrated in FIG. 1, a set point 26 connects to the controller 12, and operates to select a particular quiescent point for the system 10. As generally known in the art, adjustments to the set point 26 move the operation point of the control system 10 and cause system disturbances. In a similar manner, load 28, connected to the process 14, represents a production load, such as quantity of output, and likewise operates to effect the operation point of the control system 10 and cause disturbances. The self-tuning controller 12 adapts to maintain control of the system 10, as the set point 26 and the load 28 vary during system operation.

As generally discussed above, this adaption is accomplished by building a model of the process under control and updating this model as general behavior characteristics of the system 10 varies. A model is first built while the system is operated in open-loop mode. The adaptor 20 then generates a first set of controller parameters 25, selected for this process model, to achieve a target behavior. This first process model is built by the pre-tune procedure.

PRETUNING IDENTIFICATION

Figure 2A:
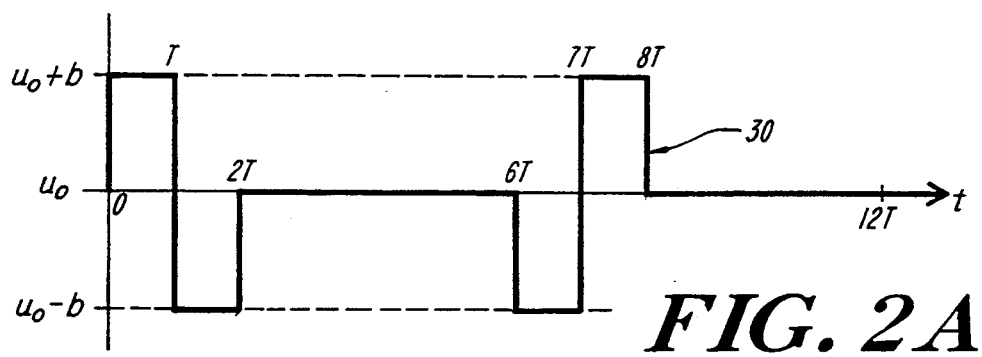
FIGS. 2A and 2B illustrate the pretuning seavence for the process illustrated in FIG. 1.
Figure 2B:
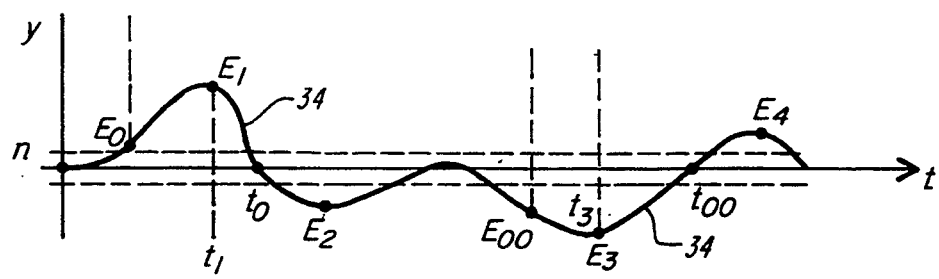

FIGS. 2a and 2b illustrate the pretune process. FIG. 2a illustrates the actuating signal 30 used to pretune the controller 18. The signal 30 is plotted against a set of axes, where the horizontal axis represents time and the vertical axis represents the magnitude of signal 30. FIG. 2b illustrates the open-loop response 34 of the process 14 to the actuating signal 30. Response 34 is signal 16, illustrated in FIG. 1, when the controller 18 is decoupled from the process 14. It is within the contemplation of this invention that other process signals that infer the value of the control variable, could also be used. The signal 34 is plotted against a set of axes where the horizontal axis represents time and the vertical axis represents the magnitude of the response signal 34.

Figure 3:
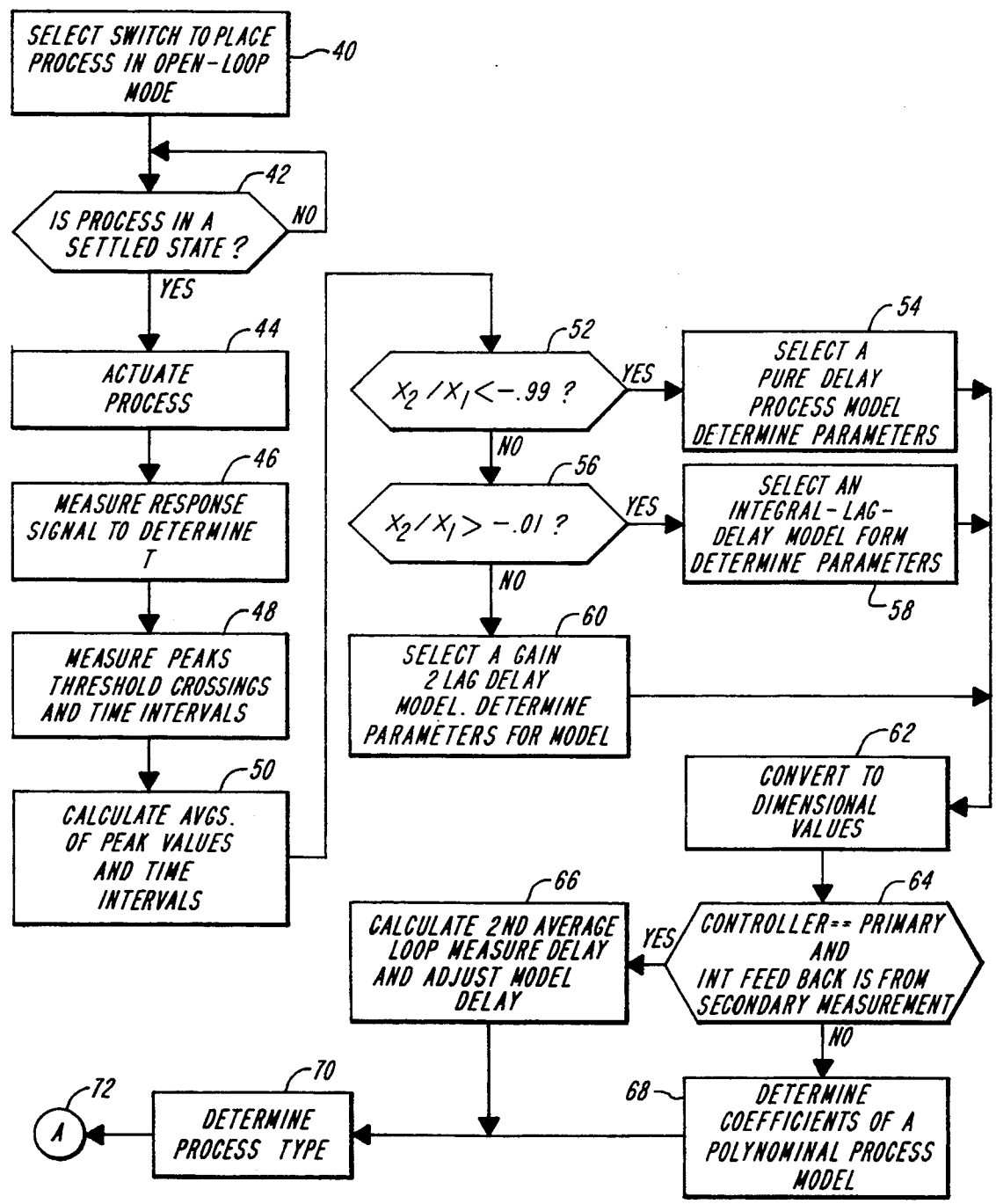
FIG. 3 is a flow chart illustrating the operating states of the controller.

With reference now to FIGS. 2a and 2b, pretune FIG. 3 illustrates a flow-diagram of the pretuning and process model identification procedure. As illustrated, preliminary steps 40 and 42 place the process in open loop mode and wait until the process is in a settled state. Once the process is determined to be settled, the pretune signal is activated in step 44, step 44, is started at time 0 when the controller is in open-loop mode and the open-loop process is reasonably settled. The actuating signal 30 is stepped from its initial value $u_0$ to $u_0+b$, where b is a user-set bump size b. At time T when the process measurement changes from its initial value $y_0$ by more than a user-set threshold n the pretune signal 30 is changed to $u_0-b$ and T is measured, step 46. In the preferred embodiment there is a user selected direction indicator switch on the controller, that indicates sign of the controller gain. For the pretune function, the response signal 34 is monitored to determine if the indicator switch is correctly set. Further, the deviation $y-y_0$ is arbitrarily defined as the positive signal 34 direction. This adjustment causes $E_0$, the value of signal 34 at time T, and E, the value of the first peak, to have the same sign as b.

Once T is determined, the pretune procedure enters state 46, and activates the search for the peak values, threshold crossings and the time intervals.

At time 2 T, the signal 30 is switched back to its initial value $u_0$ where it remains until 6 T. As can be seen from FIG. 2b, sometime $T_1$, between T and 3 T, signal 34 will reach its first peak value $E_1$. If signal 34 crosses zero after peak 1, the time of crossing is noted as $t_0$. Signal 34 may reach a second peak value $E_2$ in the opposite direction before 6 T. If a second peak is not reached, $E_2$ is the value of the response signal 34 at 6 T.

After time 6 T, values of signal 34 are calculated based on $y-y_6$, where $y_6$ is the value of y at time 6 T. This is done to eliminate slow drift effects and lack of complete recovery. At time 6 T, the output is stepped back to $u_0-b$. At time 7 T, the value of signal 34 is noted as $E_{00}$ and the output is stepped to $u_0+b$. At time 8 T, the output is stepped back to its initial value $u_0$ where it remains. Some time $t_3$ between 7 T and 9 T, the response 34 will reach its (negative) third peak value $E_3$.

If the response 34 crosses zero after peak 3, the time of crossing is noted as $t_{00}$. The response Signal 34 may reach a fourth peak value $E_4$ in the opposite direction before 12 T. If not $E_4$ is estimated as the value of Signal 34 at 12 T. At time 12 T, the identification calculation is performed based on T, b, step 50.

$$X_0 = (E_0 - E_{00})/(2b) \quad (1a)$$

$$X_1 = (E_1 - E_3)/(2b) \quad (1b)$$

$$X_2 = (E_2 - E_4)/(2b) \quad (1c)$$

$$T_1 = ((t_1 + t_3)/T - 6)/2 \quad (1d)$$

$$T_0 = ((t_0 + t_{00})/T - 6)/2 \quad (1e)$$

In the preferred embodiment, the adaptor 20 in step 50, takes differences between the corresponding amplitude values and averages the peak times to reduce the sensitivity of the resulting identification to process slow drift and nonlinearity.

As illustrated in FIG. 3, steps 52–60, select a model parameter form and calculate the values of the parameters. As can be seen from FIG. 3, there are two specific cases for model form selection, steps 52 and 56 and a more general third case, step 60. Step 60 will be explained below to illustrate the more general approach. Special cases 52 and 56 will be explained in greater detail hereinafter.

If the process model form were a gain-2 lag-delay, step 60, which is the general case, the process parameters would be as discussed above ($c_0, \tau_1, \tau_2, \tau_d$), these parameters are selected to build a process model that would cause the observed response as a result of the known input signal 30, and gain $1/c_0$.

These parameters are determined by the following equations:

$$X_0 = (1/(\tau_1 - \tau_2))(\tau_1(1 - \exp((\tau_d - 1)/\tau_1)) - \tau_2(1 - \exp((\tau_d - 1)/\tau_2)))/c_0 \quad (2a)$$

$$T_1 = \tau_d - (\tau_1 \tau_2/(\tau_1 - \tau_2))(\ln(2 \exp(1/\tau_1) - 1) - \ln(2 \exp(1/\tau_2) - 1)) \quad (2b)$$

$$X_1 = (-1 + \exp((\tau_d - T_1)/\tau_1))(2 \exp(1/\tau_1) - 1)/c_0 \quad (2c)$$

$$\ln(-c_0 X_2) = (2/(\tau_1 - \tau_2))(\tau_1 \ln(\exp(1/\tau_1) - 1) - \tau_2 \ln(\exp(1/\tau_2) - 1) \quad (2d)$$

The variables $X_0$, $X_1$, $T_0$ and $X_2$ are determined from the signal 34 and the time constants have been normalized as multiples of T. It should be appreciated by those skilled in the art, that these equations, determined from the expected step response of the chosen model, pertain to the selected model form. Other model forms can be substituted and their step response equations determined; these substitutions are within the contemplation of the invention. These are four equations for the four process parameters; inverse gain $c_0$, primary lag $\tau_1$, secondary lag $\tau_2$, and delay time $\tau_d$. These four equations can be solved to determine the four process parameters. When the equations are solved the process model is now understood to be identified.

When $\tau_1$ and $\tau_2$ are assumed or known, equation 2b can be used to solve for $\tau_d$ and 2c for $c_0$.

$$\tau_d = T_1 + (\tau_1 \tau_2/(\tau_1 - \tau_2))(\ln(2 \exp(1/\tau_1) - 1) - \ln(2 \exp(1/\tau_2) - 1)) \quad (3a)$$

$$c_0 = (-1 + \exp((\tau_d - T_1)/\tau_1))(2 \exp(1/\tau_1) - 1)/X_1 \quad (3b)$$

Then normalized equations 2a and 2d provide 2 implicit equations 4a and 4b that can be solved iteratively for $\tau_1$ and $\tau_2$ using Newton's method.

$$h = X_0/X_1 - (1/(\tau_1 - \tau_2))(\tau_1(1 - \exp((\tau_d - 1)\tau_1)) - \tau_2(1 - \exp((\tau_d - 1)\tau_2)))/(c_0 X_1) = 0 \quad (4a)$$

$$g = X_2/X_1 + \exp((2/(\tau_1 - \tau_2))(\tau_1 \ln(\exp(1/\tau_1) - 1) - \tau_2 \ln(\exp(1/\tau_2 - 1)))/(c_0 X_1) = 0 \quad (4b)$$

The equations 3 and 4 become ill conditioned when $\tau_2$ and $\tau_1$ become equal. This is a limiting case that can be prevented by stopping the iterations when $\tau_2$ and $\tau_1$ become arbitrarily close.

Identification of a process model including a secondary lag requires an iterative solution. Newton's method can be used and it achieves fast convergence if the initial solution estimate is sufficiently close to the true solution. When trying to find the value of x that will cause $f(x)$ to be zero, the function f is approximated by its derivative $f^1(x)\delta x$ at the current approximation x. The change in x, $\delta x$, is given by:

$$\delta x = -[f^1(x)]^{-1} f(x)$$

When there are n functions and n variables $f^1(x)$ is an n-by-n Jacobian matrix. The partial derivatives in this matrix are calculated algebraically in the present implementation. However, they could have been approximated by finite differences (chordal slopes). If the $f(x)$ functions are not monotonic functions of the variables x, the gradients at the initial estimate of x might have the wrong sign. This could cause convergence to an undesired solution or no convergence at all. For such functions it is necessary to start in the neighborhood of the desired solution. A useful approach for determining an initial value will be described in greater detail hereinafter.

The special cases, steps 52 and 56, must be treated separately to avoid dividing by 0, dealing with infinite values, or misusing invalid peak information.

When $X_2/X_1$ is less than $-0.99$, as illustrated in step 52, the process is assumed to be nearly a pure delay for which $$X_2/X_1 = -1 \quad (5a)$$

$$c_0 = 1/X_1 \quad (5b)$$

$$\tau_1 = (t_0 - 2)/\ln(2) \quad (5c)$$

$$\tau_2 = 0 \quad (5d)$$

$$\tau_d = 1 \quad (5e)$$

When $X_2/X_1$ is greater than $-0.01$, step 56, the process is assumed to be an integral-lag-delay for which $X_2/X_1 = c_0 = 0$ and $\tau_1$ is infinite. Instead of $\tau_1$, the finite $c_1 = c_0 \tau_1$ is used. When $\tau_2$ is assumed or known, equation 3a and 3b become:

$$\tau_d = T_1 - \tau_2 \ln(2 \exp(1/\tau_2) - 1) \quad (6a)$$

$$c_1 = (2 + \tau_d - T_1) X_1 \quad (6b)$$

Then revised and normalized equation 2a provides an implicit equation 7 that can be solved iteratively for $\tau_2$ using Newton's method.

$$h = X_0/X_1 + (\tau_2(1-\exp((\tau_d-1)\tau_2)) + \tau_d - 1)/(c_1 X_1) = 0 \quad (7)$$

In order to achieve proper convergence, the iterative process must be started with initial values $\tau_2$ close to the desired solution. A useful initial value has been found to be:

$$\tau_2 = 1/[0.5((x0/x1) - T1 - 2) - 1] \quad (8)$$

provided the result is positive. Otherwise, $\tau_2$ is set to 0. If the iterated value of $\tau_2$ is less than 0, $\tau_2$ is set to 0 and 8 is allowed not to be satisfied. Then:

$$\tau_d = 1 - X_0/X_1 \quad (9a)$$

$$c_1 = 1/X_1 \quad (9b)$$

When there is a significant second peak, both lags of the gain-2-lag-delay model are finite. The primary lag is estimated by interpolating tabulated values:

$$-X2/X1(i=0,1..7) = [0.999, 0.964, 0.769, 0.498, 0.316, 0.220, 0.172, 0.149] \quad (10a)$$

$$\tau_1 2^{(i-3)} \quad (10b)$$

$$\tau_2 = 0.5\tau_1 \quad (10a)$$

The initial estimate for algebraic tuning of a dead-time controller is given by equation 46a,b,c.
If the iterated value of $\tau_2$ is less than 0, $\tau_2$ is set to 0 and 3a is allowed not to be satisfied. Then:

$$\tau_1 = -1/\ln(1 + X_2/X_1) \quad (11a)$$

$$c_0 = -X_2/X_1^2 \quad (11b)$$

$$\tau_d = 1 + \tau_1 \ln(1 - c_0 X_0) \quad (11c)$$

When normalized values of $c_1(=c_0\tau_1)$, $\tau_2$, and $\tau_d$ have been calculated they are converted to dimensional values in step 62, by multiplying each value by the pulse width T.

With reference to FIG. 1, if the controller is the primary of a cascade and the integral feedback input is supplied from the secondary measurement, the mean delay of the secondary loop is included in the pretune model and will add to the integral or delay time of the primary controller, steps 64 and 66. As a partial correction for this effect, the identified model delay can be reduced by the secondary mean delay time, since the controller effective integral or delay time will include a contribution from the secondary loop. The calculated integral or controller delay should be decreased by the secondary mean delay time.

The secondary loop mean delay can be measured as the time between the output step change at time T from $u_0+b$ to $u_0-b$ until the integral feedback input crosses 0. This time should be averaged with the similar time difference following the step in the opposite direction at time 7 T.

Then in step 68 coefficients of a denominator polynomial process model are computed using a Taylor series representation of the inverse delay.

$$y = \exp(-\tau_d s)/((c_0 + c_1 s)(1 + \tau_2 s)) u \quad (12a)$$
$$= 1/(a_0 + a_1 s + a_2 s^2 + a_3 s^3 \dots) u \quad (12b)$$
$$\exp(\tau_d s) = 1 + \tau_d s + (\tau_d s)^2/2 + (\tau_d s)^3/6 \dots \quad (12c)$$

$$a_0 = c_0 \quad (13a)$$

$$a_1 = c_0(\tau_2 + \tau_d) + c_1 \quad (13b)$$

$$a_2 = c_0(2\tau_2 + \tau_d)\tau_d/2 + c_1(\tau_2 + \tau_d) \quad (13c)$$

$$a_3 = c_0(3\tau_2 + \tau_d)\tau_d^2/6 + c_1(2\tau_2 + \tau_d)\tau_d/2 \quad (13d)$$

$$a_4 = c_0(4\tau_2 + \tau_d)\tau_d^3/24 + c_1(3\tau_2 + \tau_d)\tau_d^2/6 \quad (13e)$$

$$a_5 = c_0(5\tau_2 + \tau_d)\tau_d^4/120 + c_1(4\tau_2 + \tau_d)\tau_d^3/24 \quad (13f)$$

The Pretune method determines four process parameters. As explained in greater detail hereinafter, four parameters are needed to determine PID tuning by the algebraic tuning method. It also provides sufficient information for PI$\tau$ and PID$\tau$ tuning if the process is well modeled with a two-lag-delay. In step 70, the four parameters are interpreted as process type characteristics according to the following equations.

| | |
|---|---|
| inverse gain | $a_0$, |
| time scale | $a_1 = a_0(\tau_1 + \tau_2 + \tau_d)$, |
| process type | $pr\_typ = (-1 + 4(\tau_1/(\tau_1 + \tau_2 + \tau_d))^2)/3$, |
| derivative factor | $dfct = 1 + 3(\tau_2/(\tau_2 + \tau_d))^2$. |

Figure 4:
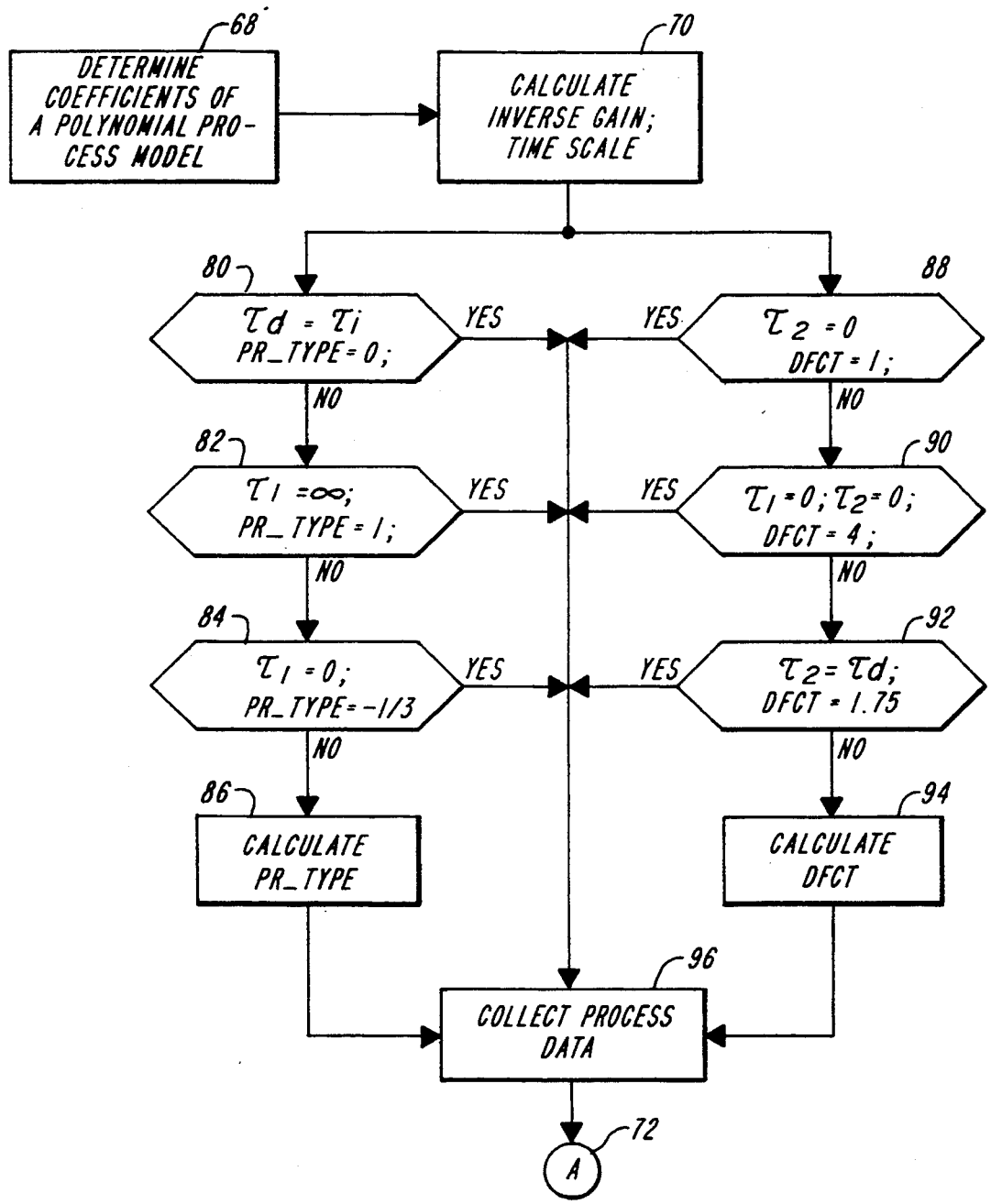
FIG. 4 is a flow diagram illustrating the operating states for determining the process type variable.

FIG. 4 illustrates in more detail the process for selecting the process type data. In steps 80 through 86, the pr_typ variable is determined accordingly to the determined time constants. In steps 88 through 94 the dfact variable is determined according to the determined time constants. In step 96 the process type variable and derivative action variable are collected and stored for use by the adaptor 20. The process type pr_typ is chosen to be 0 for a lag-delay process and 1 for an integral-delay. It is $-\frac{1}{3}$ for a pure delay. The derivative factor dfct is chosen to be 1 for a process with no secondary lag and 4 for a double-integral-delay process. It is 1.75 for a secondary-lag-delay process.

PARTIAL IDENTIFICATION

In a further embodiment of the present invention, the adaptor 20 has means to identify a two-parameter process model. This partial identification of the process obtained from observations of response signal 16 is used to self-tune controllers including PID controllers and dead-time controllers. The following equations are used to determine the ratios of the process parameters.

$$\tau_2/(\tau_2 + \tau_d) = ((dfct - 1)/3)^{0.5} \quad (b\ 14a)$$

$$(\tau_2 + \tau_d)/\tau_1 = (4/(3\ pr_{13}typ + 1))^{0.5} - 1 \quad (14b)$$

As explained in co-pending U.S. application Ser. No. 08/096,599, previously incorporated, a complex root (eigenvalue) of the closed-loop characteristic equation can be determined from the process 14 operated in closed-loop mode. At this closed-loop root, the product of the controller and process functions is $-1$. The product of the magnitudes is 1 and the phases sum to $-\pi$. The controller function is known and therefore its phase $\Phi_c$ and magnitude can be calculated. The structure of the process is initially determined by the pretune procedure as related in equation 14. Thus its phase and magnitudes can be expressed in terms of two unknown parameters determining its amplitude $c_0$ (or $c_1$) and time scales $\tau_2 + \tau_d$. Once the time scale parameter is found, the amplitude parameter can be found directly. The phase equation is a transcendental equation for the time scale parameter only and is solved iteratively using Newton's method as generally known in the art.

Pr_typ as previously shown, is determined as a result of pretuning. When these ratios of model parameters are fixed, the ratios of controller time constants to $\tau_2+\tau_d$ and the product of proportional band P and $c_0+c_1/(\tau_2+\tau_d)$ are invariant after Pretune. As a result, tuning can be updated by applying the factors to the identified amplitude and time scale parameters.

An advantage of the partial identification method is that complete information is not required. The response need not be isolated, the new peak search may have been triggered before the process has settled. The response may be identifiably nonlinear; output limited, or measurement out of range during a part of the transient. The response may be a damped or expanding sinusoid superimposed on a slower transient. In these cases, the controller is not retuned if the attenuation is less than 0.5, indicating adequate loop stability.

In a further embodiment, when the attenuation of an isolated response is less than 0.2 or if only one peak has been confirmed, an expert system rule is used to tighten the proportional band. If the load response is asymmetric as measured by the ratio of the time between the first peak and the next noise-threshold crossing to the time between the first noise-threshold crossing and the first peak exceeding 1.2, the proportional band is tightened by an arbitrary percentage (10%). Other rules may be used, particularly for hastening recovery from grossly sluggish PID mis-tuning.

This is a controller algorithm that can be implemented in a PID controller.

ALGEBRAIC TUNING

The algebraic tuning procedure can be applied once the pretune or the partial identification procedure has built a process model. Generally, the algebraic tuning procedure calculates the new controller parameters directly from the identified process model, in order to achieve a target behavior for the control system. The algebraic tuning procedure is illustrated in the following examples, but to those skilled in the art it should be apparent that these examples are just illustrative of the basic tuning approach.

Example 1

This example illustrates the algebraic tuning of an interacting PID controller and a non-interactive PID controller. In this example, the PID controller is coupled with a response signal filter and a set point lead-lag filter. It also includes PI control as a special case (D=0).

Figure 5:
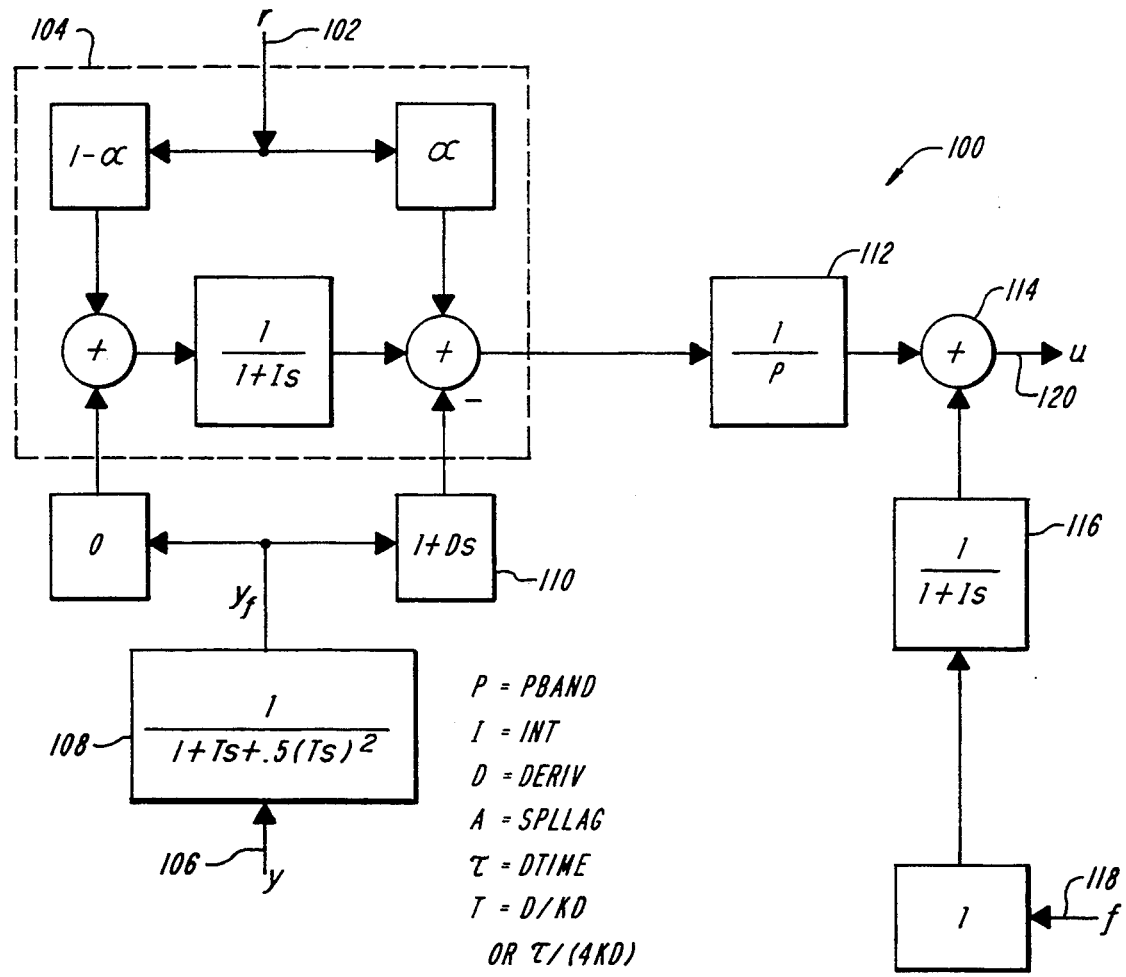
FIG. 5 is a block diagram of an interacting PID controller according to the present invention.

FIG. 5 illustrates the structure of an interacting PID controller 100. The PID controller 100 connects to set point r 102 at the lead-lag filter 104. As illustrated, filter 104 has a programmable parameter $\alpha$, that is tuned during the tuning procedure. Controller 100 connects to the measurement signal y 106, at the measurement filter 108, and the filter 108 connects to the derivative filter 110. The output of the lead-lag filter 104 connects to the proportional control term 112 and the output of the proportional control term 112 connects to the output junction 114. The output junction sums the output of proportional control term 112 and the output of the integral filter 116, that filters the integral feedback signal 118. The output of the junction 114 is the controller output u, 120. The controller output u, in one embodiment is connected to the integral filter 116 as the feedback signal 118. As can be seen from FIG. 5, the interacting PID controller 100 can be represented by the equation:

$$u=1/(1+Is)f+(1/P)(((1+\alpha Is)/(1+Is))r-(1+Ds)y_f) \quad (15a)$$

where the filtered measurement $y_f$ is $$y_f=(1/(1+\tau_f s+0.5(\tau_f s)^2))y \quad (15b)$$

and $$1/\tau_f=(1/D+1/I)k_D. \quad (15c)$$

When the integral feedback f is made equal to the controller output u, equation 1 becomes $$u=(1/(PIs))((1+\alpha Is)r-(1+Is)(1+Ds)i\ y_f \quad (15d)$$

It can be seen from equation 15c that the measurement filter time constant is linked to both the derivative time and integral time, tending to follow the smaller of the two. As a result the controller can be tuned either with integral time I larger than the derivative time D or vice versa without retuning $k_D$. The filter itself is not applied only to the derivative term. This provides more effective filtering of high-frequency process and measurement noise for which controller action would be ineffective, thus reducing unproductive controller output activity.

Figure 6:
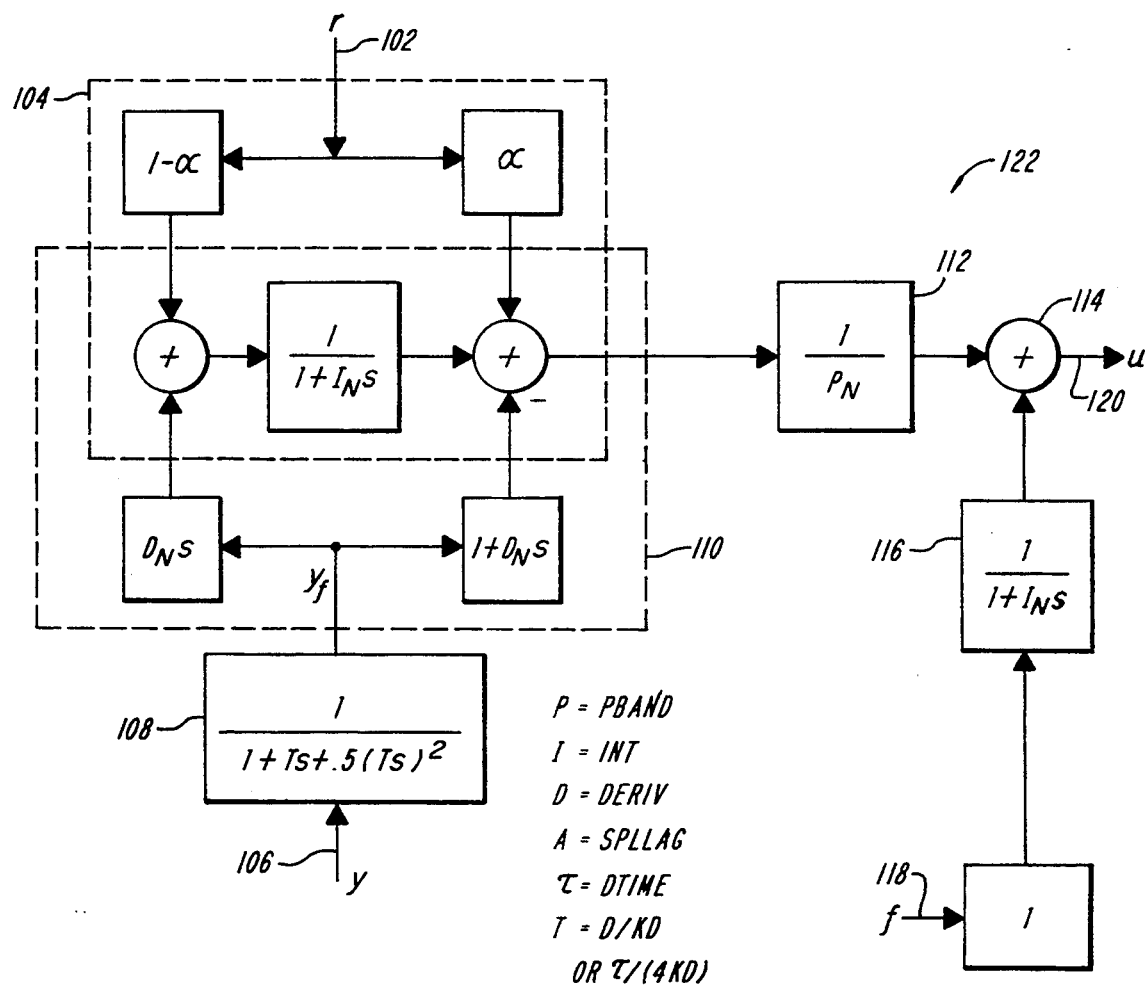
FIG. 6 is a block diagram of a non-interacting PID controller according to the present invention.

FIG. 6 illustrates a non-interacting PID controller 122, constructed according to the invention. As illustrated, the PID controller 122 has a derivative filter 110 that interacts with the lead-lag filter 104. In this way, the derivative filter 104 shares the integral lag Ins with the lead-lag filter 104. As can be seen from FIG. 6, the non-interacting PID is realized with $$u=1/(1+I_N s)(f+(D_N/P_N)s\ y_f)+(1/P_N)$$
$$(((1+\alpha_N I_N s)/(1+I_N s))r-(1+D_N s)y_f) \quad (15e)$$

$$\tau_f=D_N/k_D.$$

When the integral feedback f is made equal to u, equation 15e becomes $$u=(1/(P_N I_N s))((1+\alpha_N I_N s)r-(1+I_N s+I_N D_N s^2)y_f)$$

A new feature of this algorithm is the achievement of the desirable non-interacting form without giving up the long-known anti-windup and cascade performance improvement of the interacting form achievable through proper connection to the integral feedback input f in equation 15e. Another feature for a non-interacting controller is a set-point lead-lag function, so that $\alpha_N$ may be tuned to achieve good setpoint tracking when $P_N$, $I_N$, and $D_N$ are tuned for good load-disturbance rejection.

Non-interacting settings may be calculated from interacting settings and, if 4 $D_N$ is not greater than $I_N$ interacting settings may be calculated from the non-interacting settings. Non-interacting settings are calculated according to the following equations.

$$1/D_N=(1/D+1/I)$$

$$I_N=I+D$$

$$1/P_N=(1+D/I)/P$$

$$\tau_N I_N = \alpha I$$

Measurement filtering in these non-interacting and interacting controllers is identical. As a result these controllers can be tuned to have identical loop performance for any process not having two dominant lags. In the preferred embodiment, the noninteracting controller is used to provide an underdamped numerator function ($I_N < 4\, D_N$) to the filtered measurement.

Algebraic tuning is a procedure for calculating the tuning parameters of a controller when the process model is characterized in an all denominator form; as obtained in step 68. The process model has the form:

$$(a_0+a_1 s+a_2 s^2+a_3 s^3 \dots)y=u+v$$

where y is the controlled measurement, u is the controller output, and v is a load.

Figure 7:
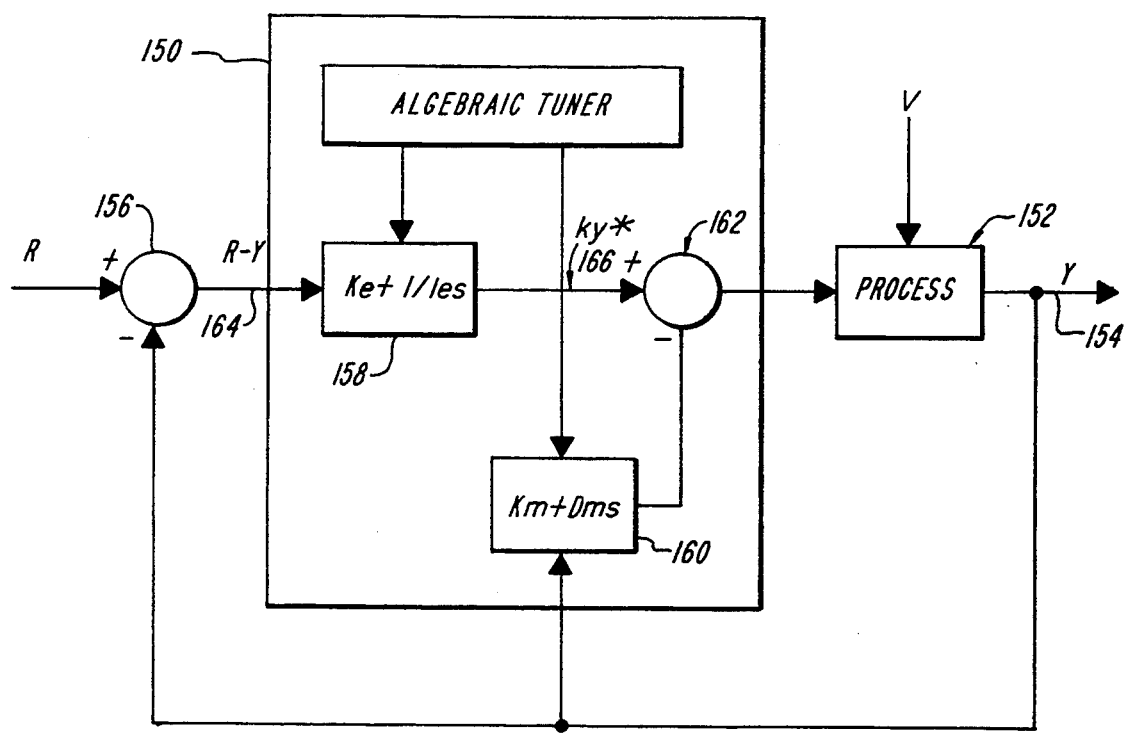
FIG. 7 is a block diagram of a control system constructed according to one embodiment of the invention.

With reference now to FIG. 7, the algebraic tuning of a PID controller, can be explained. As illustrated in FIG. 7, a controller 150, connects to a process 152 that has a measured variable y 154 connected to the controller 150 and the set point junction 156. The controller 150 has a proportional and an integrating filter 158 connected to the set point junction 156, and has a derivative and proportional filter 160 connected to the measured variable 154. The outputs of filters 158 and 160 connect at the junction 162. As can be seen from FIG. 5, the cascade controller has the form:

$$u=((1/I_e s)+K_3)(r-y)-(K_m+D_m s)y \tag{16}$$

where $I_e$ and $K_e$ are integral and gain applied to error signal 164 and $K_m$ and $D_m$ are gain and derivative applied to measurement 154. Any measurement filter within the system is assumed negligible or it is lumped with the process 152 in the coefficients.

Combining the process and the inner PD controller to eliminate u gives:

$$(K_m+a_0+(D_m+a_1)s+a_2 s^2+a_3 s^3 \dots)y=y^*+v \tag{17}$$

The inner loop set point ky* is the output of the outer loop PI controller:

$$y^*=((1/I_e s)+K_e)(r-y) \tag{18}$$

The target for the inner loop is chosen to be a pure delay in order that no derivative action be applied when the open loop process is a pure delay. The inverse delay is approximated as a Taylor series polynomial.

$$e^{\tau s}y=(1+\tau s+(\tau s)^2/2+(\tau s)^3/6 \dots)y=k(y^*+v) \tag{19}$$

Matching 17 and 19 out to the third order term gives four equations for the four unknowns $K_m$, $D_m$, $\tau$, and k.

$$K_m+a_0=1/k \tag{20a}$$

$$D_m+a_1=\tau/k \tag{20b}$$

$$2 a_2=\tau^2/k \tag{20c}$$

$$6 a_3=\tau^3/k \tag{20d}$$

Note that the controller has no effect on terms of higher than first order. If the process has an unstable high frequency root, it cannot be stabilized with a PID controller. There results:

$$\tau=3 a_3/a_2 \tag{21a}$$

$$k=\tau^2/(2\, a_2) \tag{21b}$$

$$D_m=\tau/k-a_1 \tag{21c}$$

$$K_m=1/k-a_0 \tag{21d}$$

When less derivative action is required, an estimated (larger) value of $a_3$ can be used. If $a_3$ is set to $$a_3=2\, a_2^2/(3\, a_1),$$

$D_m$ will be 0.

Combining the outer loop controller 18 and process 19:

$$((1/(I_e s)+K_e+(1+\tau s+(\tau s)^2/2+(\tau s)^3/6 \dots)/k)y=(1/(I_e s)+K_e)r+v \tag{22}$$

The outer loop target is chosen to be n equal lags each with time constant $\tau_o/n$ in order to achieve a fast settling response without appreciable overshoot.

$$(1+(\tau_o/n)s)^n y=r+(I_e s)/(1+K_e I_e s))v \tag{23}$$

Matching 22 and 23 out to the fourth order term results in four equations for $I_e$, $K_e$, $\tau_o$, and n.

$$(K_e+1/K)I_e=K_e I_e+\tau_o=(1+\beta)\tau_o \tag{24a}$$

$$\tau I_e/k=((n-1)/(2n)+\beta)\tau_o^2 \tag{24b}$$

$$\tau^2 I_e/(2k)=((n-1)/(2n))((n-2)/(3n))+\beta)\tau_o^3 \tag{24c}$$

$$\tau^3 I_e/(6k)=((n-1)/(2n))((n-2)/(3n))((n-3)/(4n))+\beta)\tau_o^4 \tag{24d}$$

An iterative solution (using Newton's method) yields:

$$n=10.4 \tag{25a}$$

$$\tau_o=1.539\, \tau \tag{25b}$$

$$I_e=k\, \tau_o \tag{25c}$$

$$K_e=\beta/k=0.1977/k \tag{25d}$$

This demonstrates that the penalty of conventional integral action is the slowing down of the closed loop process by roughly a factor of 1.5 ($\tau_o/\tau$).

Thus equations 21 and 25 determine tuning constants and closed loop performance. However these tuning constants are not those used in the interacting and noninteracting PID algorithms. To convert to noninteracting PID:

$$I_N=I_e(K_m+K_e) \tag{26a}$$

$$D_N=D_m/(K_m+K_e) \tag{26b}$$

$$P_N=1/(K_m+K_e) \tag{26c}$$

$$\alpha N=K_e/(K_m+K_e) \tag{27}$$

To convert to interacting PID first calculate x:

$$x=(K_m+K_e)^2-4\, D_m/I_e \tag{28}$$

If x is greater than 0:

$$P = 2/(K_m + K_e + x^{0.5}) \tag{29a}$$

$$I = I_e/P \tag{29b}$$

$$D = D_m P \tag{29c}$$

$$\alpha = K_e P \tag{29d}$$

Otherwise two equal real numerator roots will be used:

$$P = 2/(K_m + K_e) \tag{30a}$$

$$I = D = (I_e D_m)^{0.5} \tag{30b}$$

$$\alpha = K_e P \tag{30c}$$

The advantage of algebraic tuning is that it allows both the tuning constants (P, I, D, and $\alpha$) and closed loop performance measures (mean delay time $\tau_o$ and a measure of rise time n) to be calculated directly from a polynomial model (including terms up to third order in s) of the open loop process.

Example 2

This example illustrates the algebraic tuning of dead-time controllers. Dead-time control algorithms are used that can be algebraically tuned and that offer improved steady-state performance.

PI$\tau$ CONTROL

Figure 8:
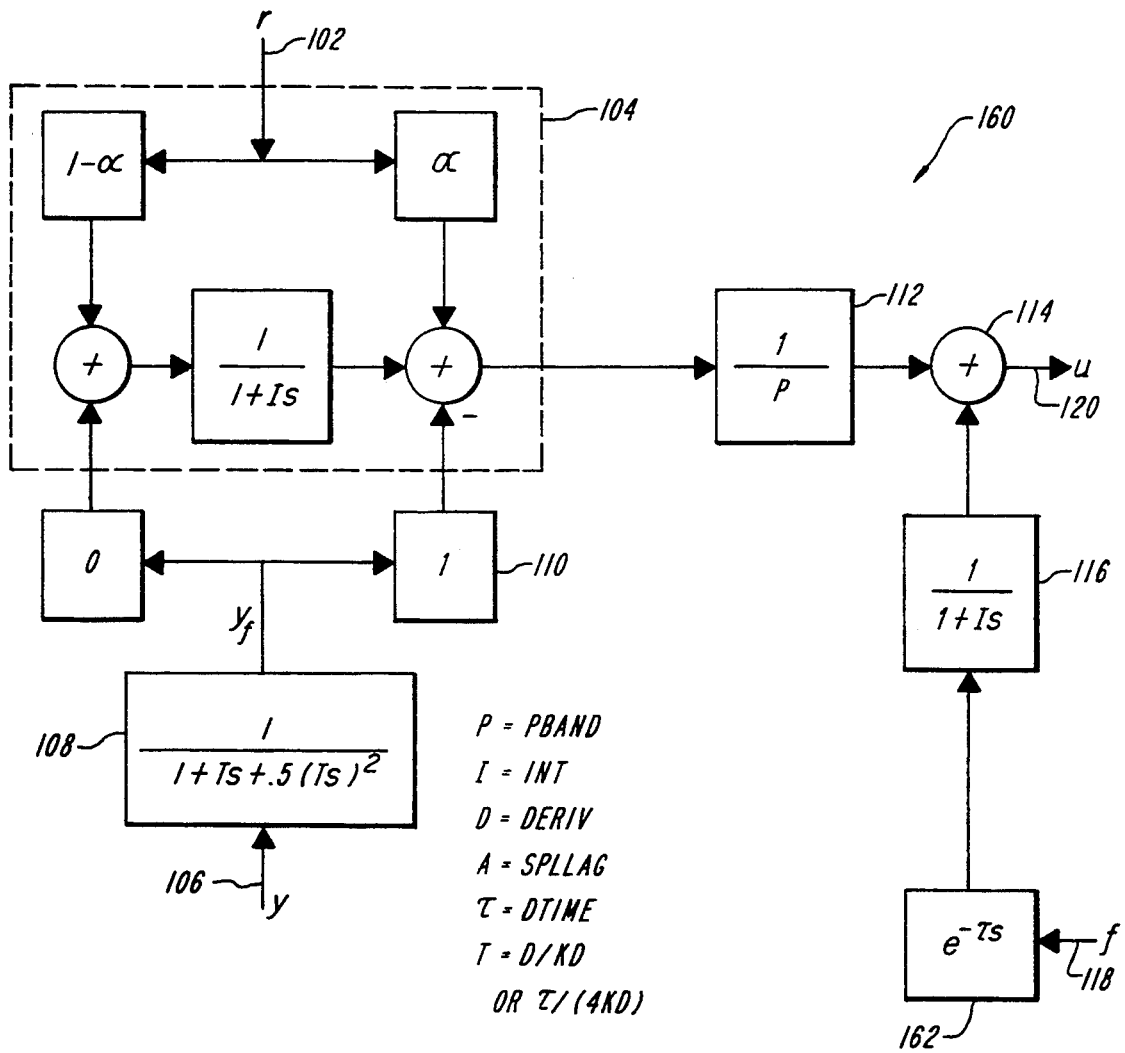
FIG. 8 is a block diagram of a PI$\tau$ controller.

Improved performance is achieved by replacing as much conventional integral action, caused by a lag I in the integral feedback path, with effective integral action resulting from a delay (dead-time) $\tau$. The improvement arises because of phase lead introduced by the unconventional integration. FIG. 8 illustrates a PI$\tau$ controller 160, having a structure adaptable according to the present invention. The controller 160, as illustrated, is a dead-time controller, having a dead-time filter 162, connected within the integral feedback path. The dead-time filter 162 connects to the integral feedback signal 118 and connects to the integral filter 116. As further illustrated, the derivative filter 110 has a unitary gain and does not have a phase component. As can be seen from FIG. 8, the PI$\tau$ controller can be recognized by the equation:

$$u = (e^{-\tau s}/(1 + I s))f + (1/P)((1/(1+I s))r - y_f) \tag{31}$$

$$\tau_f = 0.25 \, \tau/k_D \tag{32}$$

When the integral feedback f is made equal to u, equation 31 becomes $$u = (1/(P(I s + 1 - e^{-\tau s})))(r - (1+I s)y_f \tag{33}$$

If the process has a substantial lag, all of the conventional integral action cannot be replaced if derivative action is disallowed, since lead applied to the filtered measurement in equation 33 is needed for best loop performance.

A new feature for this algorithm is the set-point lag filtering provided to achieve good set-point tracking when P, I, and $\tau$ are tuned to reject load disturbances. The filter time is set to I in order that there be no lead applied to the set point r in equation 33.

PID$\tau$ CONTROL

Figure 9:
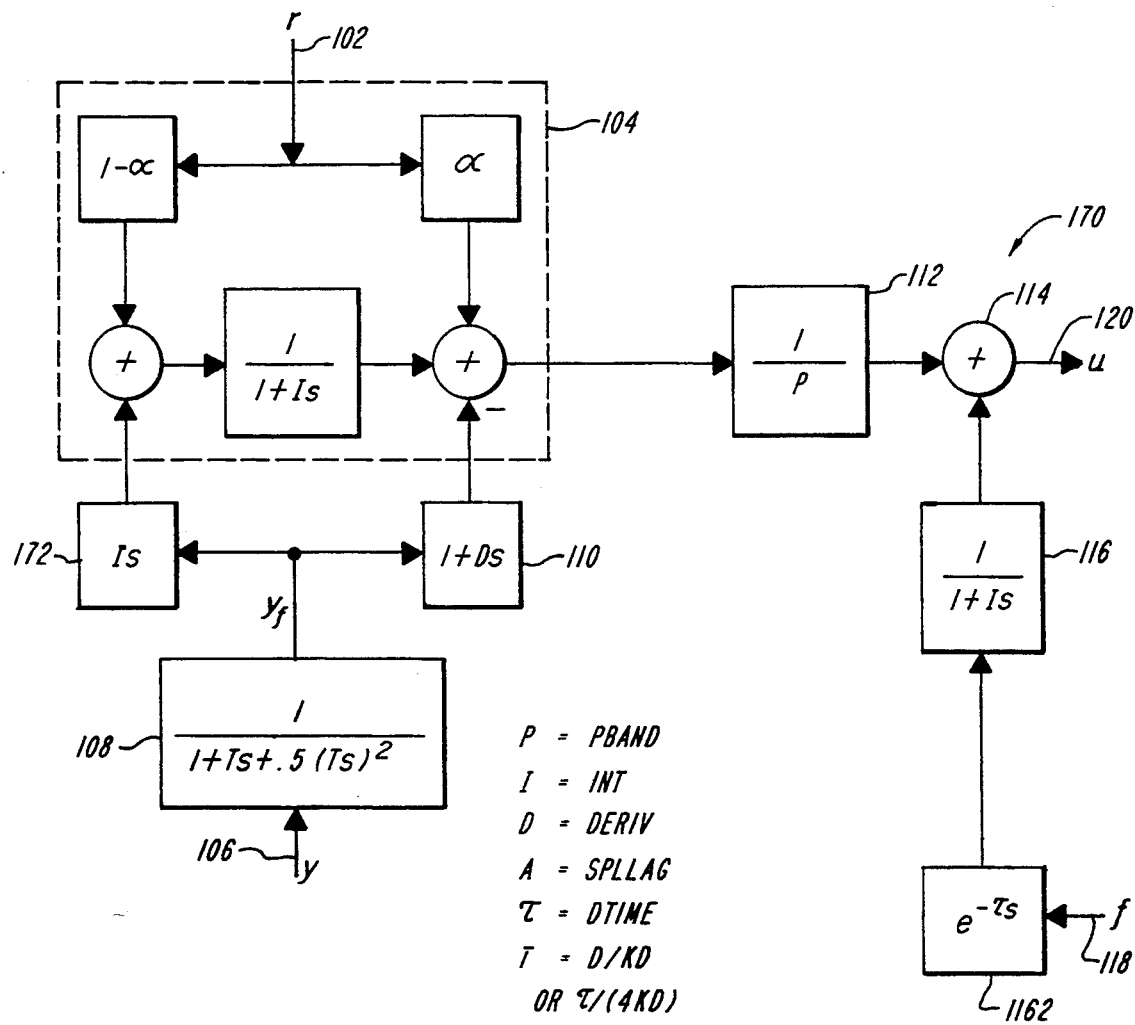
FIG. 9 is a block diagram of a PID$\tau$ controller.

This PID$\tau$ algorithm has improved performance compared with the interacting form particularly when the process has two dominant lags. FIG. 9 illustrates a PID$\tau$ controller 170, having a structure that is adaptable according to the present invention. The controller 170 has a dead-time filter 162 connected within the integral feedback path, and has an integrating filter 172, connected between the measurement filter 108 and the lead-lag filter 104. As can be seen from FIG. 9, the controller 170 can be represented by the equation:

$$u = ((1/(1+I s))e^{-\tau s}f) + (1/P)((1/(1+I s)) (r + I s y_f) - (1 + D s)y_f) \tag{34}$$

$$\tau_f = 0.25 \, \tau/k_D \tag{35}$$

When the integral feedback f is made equal to u, equation 12 becomes $$u = (1/(P(I s + 1 - e^{-\tau s})))(r - (1 + D s + D I s^2)y_f) \tag{36}$$

When this controller is tuned, its derivative time D and delay time $\tau$ are made larger than the integral time I. In fact when the process is a lag delay, I may be set to 0. Consequently the middle term in the quadratic operating on the filtered measurement should be D s, not I s as in the non-interacting PID. This is achieved by adding I/P times the derivative of the filtered measurement (s $y_f$) into the set point filter in equation 34.

Another new feature for this algorithm is the set-point lag filtering provided to achieve good set-point tracking when P, I, D, and $\tau$ are tuned to reject load disturbances. The filter time is set to I in order that there be no lead applied to the set point r in equation 36.

ALGEBRAIC TUNING FOR PI$\tau$ and PID$\tau$ DEAD-TIME CONTROLLERS

Again the process can be characterized in an all denominator form:

$$(a_0 a_1 s + a_2 s^2 + a_3 s^3 \ldots )y = u + v \tag{37}$$

where y is the controlled measurement, u is the controller output, and v is a load. The PID$\tau$ controller is given by equation 36.

$$u = (1/(P(I s + 1 - e^{-\tau s})))(r - (1 + D s + D I s^2)(y) \tag{38}$$

Either the measurement filter is assumed negligible or it is lumped with the process in the a coefficients.

Combining the process and PID$\tau$ controller equations $$((1 + DS + D I s^2) + P(I s + 1 - e^{-\tau s})(a_0 a_1 s + a_2 s^2 + a_3 s^3 \ldots ))y = r + P(I s + 1 - e^{-\tau s})v \tag{39}$$

It is not necessary (or possible) to break the dead-time controller into inner and outer loops as was done in the algebraic design of the PID, because D (and I) will turn out to be zero for a pure delay process. Expanding the controller delay into its Taylor series and multiplying the resulting controller and process denominator polynomials results in a polynomial whose coefficients are functions of the unknowns I and $\tau$:

$$f_1 = (I + \tau)a_0 \tag{40a}$$

$$f_2 = (I + \tau)a_1 - (\tau^2/2)a_0 \tag{40b}$$

$$f_3 = (I+\tau)a_2 - (\tau^2/2)a_1 + (\tau^3/6)a_0 \tag{40c}$$

$$f_4 = (I+\tau)a_3 - (\tau^2/2)a_2 + (\tau^3/6)a_1 - (\tau^4/24)a_0 \tag{40d}$$

$$f_5 = (I+\tau)a_4 - (\tau^2/2)a_3 + (\tau hu\ 3/6)a_2 - (\tau^4/24)a_1 + (\tau^5/120)a_0 \tag{40e}$$

$$f_6 = (I+\tau)a_5 - (\tau^2/2)a_4 + (\tau^3/6)a_3 - (\tau^4/24)a_2 + (\tau^5/120)a_1 + (\tau^6/720)a_0 \tag{40f}$$

As a result $$((1+Ds+DIs^2) + P(f_1 s + f_2 s^2 + f_3 s^3 + f_4 s^4 + f_5 s^5 + f_6 s^6 \ldots))y = r + P(Is + 1 - e^{-\tau s})v \tag{41}$$

Choosing an 1/m equal-lag target (this allows m to be 0, whereas n = 1/m would be infinite, for the limiting case of a pure $\tau_o$ delay target):

$$(1+\tau_o m\, s)^{1/m} y = r + P(Is + 1 - e^{-\tau s})v. \tag{42}$$

Equating terms out to sixth order provides 6 equations to solve for the controller parameters P, I, D, and $\tau$ and the performance measures $\tau_o$ and m. These involve process parameters out to fifth order (the last two of which may be very difficult to determine accurately from experimental data).

$$D + P f_1 = \tau_o \tag{43a}$$

$$I D + P f_2 = ((1-m)/2)\tau_o^2 \tag{43b}$$

$$P f_3 = ((1-m)/2)((1-2m)/3)\tau_o^3 \tag{43c}$$

$$P f_4 = ((1-m)/2)((1-2m)/3)((1-3m)/4)\tau_o^4 \tag{43d}$$

$$P f_5 = ((1-m)/2)((1-2m)/3)((1-3m)/4)((1-4m)/5)\tau_o^5 \tag{43e}$$

$$P f_6 = ((1-m)/2)((1-2m)/3)((1-3m)/4)((1-4m)/5)((1-5m)/6)\tau_o^6 \tag{43f}$$

These can be rearranged to give equations for the closed loop mean delay time $\tau_o$, for the inverse number of lags m (which is a measure of rise time), and for each of P and D.
These can be solved when I and x are assumed or known.

$$m = (4 f_4^2 - 5 f_3 f_5)/(16 f_4^2 - 15 f_3 f_5) \tag{44a}$$

$$\tau_o = (4/(1-3m))(f_4/f_3) \tag{44b}$$

$$P = ((1-m)/2)((1-2m)/3)\tau_o^3/f_3 \tag{44c}$$

$$D = \tau_o - P f_1 \tag{44d}$$

There remain two implicit equations for g and h, from which I and $\tau_o$ can be found iteratively by Newton's method.

$$g = ((1-m)/2)\tau_o^2 - I D - P f_2 = 0 \tag{45a}$$

$$h = 2 f_4^2 f_5 - 5 f_3 f_5^2 + 3 f_3 f_4 f_6 = 0 \tag{45b}$$

Since there may be more than one solution for I and $\tau$, but only one "reasonable" solution, it is necessary to start the iterative search with values of I and $\tau$ close to that "reasonable" solution. Useful initial values (approximating the solution for an integral-lag-delay model) are:

$$x = (1. - 2 a_1 a_3 / a_2^2)^{0.5} \tag{46a}$$

$$\tau = 1.051 + 0.295\, x \tag{46b}$$

$$I = (0.7493 + 1.1879\, x)x \tag{46c}$$

If the iteratively calculated I is less than 0, I is set equal to 0 and h is not required to be 0. The result would be tuning for a PD$\tau$ controller.

The algebraic method for the PI$\tau$ controller is similar. It shares the same process equation 37, same f coefficients (equations 40), and target equation 42. Its controller is given by equation (33), as follows.

$$u = (1/(P(I s + 1 - e^{-\tau s})))(r - (1 + I s)y)$$

Either the measurement filter is assumed negligible or it is lumped with the process in the a coefficients.
The combined controller and process equations (with u eliminated) is:

$$((1+Is) + P(Is + 1 - e^{-\tau s}) (a_0 + a_1 s + a_2 s^2 + a_3 s^3 \ldots))y = r + P(Is + 1 - e^{-\tau s})v \tag{47}$$

Introducing equations 40:

$$((1+Is) + P(f_1 s + f_2 s^2 + f_3 s^3 + f_4 s^4 + f_5 s^5 \ldots))y = r + P(Is + 1 - e^{-\tau s})v \tag{48}$$

Equating terms out to fifth order with the target equation 42 provides 5 equations to solve for the controller parameters P, I, and $\tau$ and the performance measures $\tau_o$ and m.
These involve process parameters out to fourth order (the last of which may be very difficult to determine accurately from experimental data).

$$I + P f_1 = \tau_o \tag{49a}$$

$$P f_2 = ((1-m)/2)\tau_o^2 \tag{49b}$$

$$P f_3 = ((1-m)/2)((1-2m)/3)\tau_o^3 \tag{49c}$$

$$P f_4 = ((1-m)/2)((1-2m)/3)((1-3m)/4)\tau_o^4 \tag{49d}$$

$$P f_5 = ((1-m)/2)((1-2m)/3)((1-3m)/4)((1-4m)/5)\tau_o^5 \tag{49e}$$

These can be rearranged to give equations for the closed loop mean delay time $\tau_o$, for the inverse number of lags m (which is a measure of rise time), and for P. These can be solved when I and $\tau$ are assumed or known.

$$m = (3 f_3^2 - 4 f_2 f_4)/(9 f_3^2 - 8 f_2 f_4) \tag{50a}$$

$$\tau_o = (3/(1-2m))(f_3/f_2) \tag{50b}$$

$$P = ((1-m)/2)\tau_o^2/f_2 \tag{50c}$$

There remain two implicit equations for g and h, from which I and $\tau_o$ can be found iteratively by Newton's method $$g = \tau_o - I - P f_1 = 0 \tag{51a}$$

$$h = 3 f_3^2 f_4 - 8 f_2 f_4^2 + 5 f_2 f_3 f_5 = 0 \tag{51b}$$

Since there may be more than one solution for I and $\tau$, but only one "reasonable" solution, it is necessary to start the iterative search with values of I and $\tau$ close to that "reasonable" solution. Useful initial values (approximating the solution for a lag-delay model) are:

$$x = (1 - 2\, a_0 a_2/a_1^2)^{0.5} \tag{52a}$$

$$\tau = 1 + 0.4\, x \tag{52b}$$

$$I = (0.515 + 2.524\, x)x \tag{52c}$$

If the iteratively calculated I is less than 0, I is set equal to 0 and h is not required to be 0. The result would be tuning for a P$\tau$ controller.

The result of pretuning is put in a form employed by the partial model identification self tuner. The pretuner calculates two process type equations:

$$pr\_typ = \tfrac{1}{3}(\tau_1/\tau_1 + \tau_2 + \tau_d)^2 - 1)$$

$$dfct = 1 + 3\,(\tau_2/\tau_2 + \tau_d)^2$$

and four tuning factors $$k_I = I/\tau_d$$

$$k_D = D/\tau_d$$

$$k_\tau = \tau/\tau_d$$

$$k_p = P/k(\tau_1 + \tau_2 + \tau_3/\tau_2 + \tau_d).$$

The self-tuner inverts these equations to solve for $\tau_1/+\tau_2+\tau_d$, $\tau_2/\tau/\tau_1+\tau_d$, I, D, $\tau$, and P in terms of the process gain K and $\tau_d$ which are determined by the self-tuner from closed loop response pattern features.

The advantage of algebraic tuning is that control settings, providing both good load disturbance rejection and good set-point tracking, can be calculated directly from an unfactored process model. That process model could be completely or partially experimentally determined from open loop measurements as is done in the "Pretune Procedure" or from closed loop measurements as is done in the partial model identification self-tune procedure.

Appendix A describes process control technique with which the foregoing self-tuning controller can be practiced.

Techniques for Process Control by Peter D. Hansen*
*Bristol Fellow, Systems Development and Engineering, The Foxboro Co., a Siebe Co., Foxboro Mass.

This article presents a number of techniques useful in the analysis and design of modern process control systems. Particular emphasis is given to transfer function and adaptive methods which lead to designs that cope with process delay (dead time), loop interaction, nonlinearity, and unmeasured disturbances.

Digital Control

A digital controller is generally considered to be superior to an analog controller. However, if it is used to emulate an analog controller, the digital may be less effective because of phase (or delay) and resolution errors introduced by sampling and converting. The digital controller's advantage is its algorithmic flexibility and precision with respect to both calculations and logic, thereby facilitating on-line restructuring and parameter adaptation.

A digital control algorithm utilizes samples of its input signals which are discrete in both magnitude and time. Usually continuous signals are sampled at a constant rate. Sampling the controlled variable introduces phase lag (effective delay) into the feedback loop because of 1. low-pass filtering
2. computation and transmission
3. output holding between updates Effective delay or parasitic lag, whether in the digital or the analog portion of a feedback loop, has an adverse effect on performance.

Loop delay, measurement noise, and output saturation determine the performance achievable with feedback control. Minimum integrated absolute error in response to an unmeasured load increases in proportion to delay time for a dominant-delay process and in proportion to the square of delay for a dominant-lag process. Consequently the sampling-related delays should be made a small fraction of the total loop delay by using a small sampling interval.

State-Space Representation

Linear dynamic systems can be represented in terms of a state variable vector x as a set of simultaneous first order difference equations:

$$x\{t+h\} = M\, x\{t\} + N\, u\{t\},$$

$$y\{t\} = C\, x\{t\}, \tag{1}$$

where h is the computing interval, or as differential equations:

$$dx/dt = A\, x + B\, u,$$

$$y = C\, x. \tag{2}$$

In these equations u is a vector of inputs, and y is a vector of measured variables. Matrices, but not vectors, are capitalized and italicized. M and A are square matrices and N, C, and B are rectangular (non-invertible). When a zero order hold drives the continuous process, the representations are related at sampling instants by:

$$M = e^{Ah} = \sum_0^\infty (Ah)^n/n!, \tag{3}$$

$$N = A^{-1}(M - I)B = \left( \sum_0^\infty (Ah)^n/(n+1)! \right) Bh.$$

The inversion of A can be avoided by replacing M with its Taylor series, which converges (possibly slowly) for all Ah.

The state-space approach may be used to model multivariable systems whose characteristics are time varying and whose controlled variables are not measured directly. However, the representation may be inefficient because the matrices are often sparse. The approach can be generalized to characterize nonlinear systems by considering the right hand sides of 1 or 2 to be vector functions of the state variables and inputs. However, a process with a time delay cannot be represented directly with a finite differential-equation form. The difference-equation form introduces an extra state variable for each time step of delay.

Methods of analyzing observability, controllability, and stability of state-space representations are discussed in many control texts [1,2,3], as are design methods for predictors and controllers. The state-space feedback-controller design procedures lead to inflexible global control structures, which are usually linear. All manipulated variables are used to control each controllable state variable, and all measured variables are used to calculate, each observable state variable. Consequently, an on-line redesign (adaptive) capability may be needed to retune for process nonlinearity and to restructure following either an override condition or loss of a measurement or manipulator.

Transfer-Operator Representation

The state-space equations can be expressed in transfer-function form, using algebraic operators to represent forward shift (z) and differentiation (s):

$$y = C(zI-M)^{-1} N u,$$

$$y = C(sI-A)^{-1} B u. \quad (4)$$

For a single-input, single-output time-invariant system, these equations can be expressed as:

$$A y = B D u + C e, \quad (5)$$

where y is the controlled or measured variable, u is the manipulated variable, and e is a load (or disturbance) variable. A, B, C, and D are polynomial functions of s or the backward shift, $z^{-1} = e^{-hs}$. B contains stable zeros and is therefore cancelable. D may be noncancelable and has unity steady-state gain. A zero of a polynomial is a root, a value of its argument (s or $z^{-1}$) that causes the polynomial to be zero. Unstable (non-cancelable, non-minimum phase) zeros are in the right half of the complex s plane or inside the unit circle in the complex $z^{-1}$ plane. The delay operator, whose zeros are at the origin of the $z^{-1}$ plane, is non-cancelable and non-minimum phase. Its inverse, a time advance, is physically unrealizable.

For sinusoidal signals, the differentiation operator becomes $s = jw$ and the backward shift becomes $z^{-1} = e^{-jwh}$. In steady state, the radian frequency w is zero, allowing s to be replaced by 0 and $z^{-1}$ by 1 in the polynomial operators. The role of the C polynomial is played by an "observer" in state-space design. When e is dominated by measurement noise, e appears unfiltered at y; hence, C is (almost) equal to A. When e is a load upset, e appears at y filtered by the process dynamics 1/A; hence, C is (nearly) one. When e is considered an impulse, a process, that would have a non-zero steady-state response to a steady-state e input, has an additional zero at s=0 or $z^{-1}=1$ in its A and B polynomials.

An example of the conversion from the s domain to the $z^{-1}$ domain is shown in [1]. A sampled lag{$\tau_L$}-delay{$\tau_D$} process with gain{k}, whose input u is constant between sampling instants (because of a zero-order hold), is represented as:

$$(1-z^{-1}e^{-b})y = k z^{-n}(1-e^{-a}+z^{-1}(e^{-a}-e^{-b})) u, \quad (6)$$

where the delay is between n and n+1 sampling intervals, $$n h < \tau_D < (n+1)h,$$

$$a = ((n+1)h - \tau_D)/\tau_L,$$

$$b = h/\tau_L.$$

When $e^{-a} - e^{-b}$ is less than $1 - e^{-a}$, the first order factor in parentheses on the right of 6 is cancelable, and can be part Of B. Otherwise it must be part of D.

When b is very small, because the sampling interval is very small, equation 6 becomes:

$$(1-z^{-1}(1-b))y = (k/\tau_L)z^{-n}(h(n+1) - \tau_D z^{-1}(\tau_D - n h))u. \quad (7)$$

Except for the b term on the left, this is indistinguishable from an integral{$\tau_L$/k}-delay{$\tau_D$} process, signalling the likelihood of numerical difficulty in applications such as parameter (k & $\tau_L$) identification.

Presuming that the desired behavior is a function of the measured variable, y, the target closed-loop performance can be expressed as:

$$H y = D r + F e, \quad (8)$$

where H is a (minimum phase) polynomial with unity steady-state gain and stable zeros. H and F may be totally or partially specified polynomials. If e may have an arbitrary value in steady state, the steady-state value of F must be zero for y to converge to the set point (or reference input) r. Eliminating y from 5 and 8 results in:

$$A D r + A F e = H B D u + H C e. \quad (9)$$

Because D is not cancelable, this equation cannot be solved directly for u. However, the product H C may be separated into two parts, the term on the left hand side A F and a remainder expressed as the product D G, so that D becomes a common factor of 9:

$$H C = A F + D G. \quad (10)$$

This equation is key to the controller design: selecting some and solving for other coefficients of H, F, and G when those of A,B,C, and D are known or estimated.

Open-Loop Control

The open-loop controller design results when 10 is used to eliminate AFe from 9, since D is not zero:

$$u = (A r - G e)/(B H). \quad (11)$$

Of course, if e is unmeasured, open-loop control will not reduce e's effect on y. This causes F to be an infinite degree polynomial H C/A and G to be zero. If e is measured, G is a feedforward operator. Substituting u from equation 11 back into the process equation 5, and not cancelling terms common to both numerator and denominator, results in the open-loop performance equation:

$$y = B A (D r + F e)/(H B A). \quad (12)$$

To avoid (imperfect) cancelling of unstable roots, A as well as H and B must contain only stable zeros.

High performance ($H \approx 1$) open-loop control applies the inverse of the process characteristic (A/B) to a set-point change. Because a dominant-lag process has low gain at high frequencies, its controller has high gain there. A rapid set-point change is likely to saturate the manipulated variable but otherwise leave its trajectory unchanged. The early return of this variable from its limit causes slower than optimal controlled variable response. This can be avoided-by using nonlinear optimization (such as quadratic programming suggested in [4]) to compute the optimal controller-output trajectory taking into account output limits, load level and other process equality and inequality constraints.

The performance of an open-loop controller may be degraded by an unmeasured load or by mismatch between the process and the inverse controller at low frequencies. Mismatch at high frequency will not cause significant difficulty, however.

Feedback Control

Combining 10 and 11 with the target equation 8 to eliminate e, results in the closed loop control law:

$$u=(C\,r-G\,y)/(B\,F). \qquad (13)$$

This equation also results when e is eliminated from the process and target equations, 5 and 8, and D is made a common factor with the design equation 10. From 13 it is clear that the disturbance polynomial C and its equation 10 decomposition terms, F and G, play a key role in the feedback-controller design. Various methods for determining these polynomials will be discussed. Except in the special case, where C=G, the control output u does not depend exclusively on control error, r−y. However, the controller will provide integral action, eliminating steady-state error, if the steady-state values of G and C are equal and not zero, and either those of e{t}, A, and B are zero, or that of F is zero.

Substituting u from equation 13 back into the process equation and not cancelling terms common to both numerator and denominator, results in the closed-loop performance equation:

$$y=B\,C\,(D\,r+F\,e)/(H\,B\,C). \qquad (14)$$

To avoid (imperfect) cancelling of unstable roots, C as well as M and B must contain only stable zeros. However, it is not necessary that all of the zeros of A be stable when the control loop is closed. Zeros of C not common to A correspond to unobservable modes of the disturbance variable, e. Zeros of B or D not common to A correspond to uncontrollable modes of y.

When the manipulated variable saturates, it is necessary to stop (or modify) the controller integral action to prevent "windup". If the integration were allowed to continue, the prelimited controller output would continue to rise (windup) above the limit value, requiring a comparable period after the control-error reverses sign before the manipulated variable could recover from saturation. This would cause a significant (avoidable) controlled-variable overshoot of the set point. A controller of a dominant-lag process, designed for good unmeasured-load rejection, employs significant proportional (and derivative) feedback G. When responding to a large set-point change, this feedback keeps the output saturated and the controlled variable rate limited longer than would a linear open-loop controller, resulting in a faster response, [5]. Halting the integral action, while the manipulated variable remains limited, prevents appreciable overshoot.

The performance of the feedback loop is most sensitive to the process behavior in the frequency range where the absolute loop gain is near 1. Performance at significantly lower frequencies is often quite insensitive to the process characteristics, load, and controller tuning.

Robustness

The ability of a feedback loop to maintain stability, when the process parameters differ from their nominal values, is indicated with robustness measures. The locus of combined shifts of the process gain, by the factor b, and the process delay, by the factor d, that make the loop marginally stable, is a useful indicator of robustness, providing in a more physical form, the information contained in gain and phase margins. The use of two parameters, b and d, is based on the idea that the process behavior, in the frequency range critical for stability, can be approximated with an n-integral—delay two-parameter model. The integrals, whose number n may range from 0 to 1 plus the number of measurement derivatives used in the controller, contribute to the gain shift b. The phase, in excess of the fixed contribution of the integrals, and the shift in phase, d w, can be considered to be contributed by "effective" delay.

At marginal stability, the return difference (one plus the open-loop gain) is zero:

$$1+(G/FB)(bBD^d/A)=1+bGD^d/AF=0. \qquad (15)$$

Here it is assumed that D is effective delay, that may include small lags not included in A and a $(1-\tau s)/(1+\tau s)$ factor for each non-minimum phase zero.

FIG. 1 is a plot of d vs. b, using logarithmic scales, for PID control of pure-delay, integral-delay, and double-integral—delay processes. The proportional band and integral time were determined for minimum overshoot using the algebraic PID design method described in a later section. In [6] a single number, characterizing robustness, is derived from a robustness plot. This robustness index is −1 plus the antilog of the length of the half diagonal of the diamond-shaped box centered at the nominal design point (d=b=1), that touches the d vs. b curve at its closest point. A value of 1 indicates that the product or ratio of d and b can be as large as 2 or as small as 0.5 without instability. For the three cases of FIG. 1, the robustness index is 1.67, 0.47, and 0.30, each determined by sensitivity to delay shift. The diamond shaped box in the figures would correspond to a robustness index of 1.

Most control schemes capable of providing high performance, provide poor robustness, (a robustness index near 0). Adaptive tuning may be required to keep a controller, capable of high performance, current with changing process conditions.

Digital simulation provides a useful means for exploring robustness experimentally. Nonlinearities can be included naturally in the time domain. It may not be necessary to use an exotic integration algorithm, if the process can be modeled in real-factored form. The factored form can be much less sensitive to roundoff error than unfactored polynomial and state-space forms.

The simulation equations should be solved in causal sequence. Each equation's dependent variable should be updated based on the most current computed value of its independent variables (as is done in the Gauss-Seidel iterative solution of algebraic equations). A useful such model for a first-order factor, $y/x=1/(1+\tau s)$, is:

$$y\{t\}=y\{t-h\}+(h/(\tau+h))(x\{t\}-y\{t-h\}). \qquad (16)$$

and for a damped second-order factor, $y/x=1/(1+Ts+T\tau s^2)$, is:

$$v\{t\}=v\{t-h\}+(h/(\tau+h))(x\{t\}-v\{t-h\}-y\{t-h\}),$$

$$y\{t\}=y\{t-h\}+(h/(T+h))\,v\{t\}. \qquad (17)$$

The internal variable v is a measure of the derivative of the output y:

$$dy/dt \approx v\{t\}/(T+h). \quad (18)$$

These models both give the correct result when $T=\tau=0$: $y\{t\}=x\{t\}$. When the sampling interval h is very small compared with T and $\tau$, it may be necessary to compute with double precision to avoid truncation, because the second term on the right of equations 17 and 18 may become much smaller than the first before the true steady state is reached.

A fixed time delay may be modeled as an integer number of computing intervals, typically 20 to 40. At each time step, an old data value is discarded and a new value added to a storage array. Incremented pointers can be used to keep track of the position of the delay input and output, as in a ring structure. This avoids shifting all the stored data each time step, as in a line structure.

Feedforward Control

Feedforward control, to counteract the anticipated effect of a measured load $e_M$, combined with feedback control, to mitigate the effect of an unmeasured load $e_U$, makes use of two design equations like 10, one for each load type:

$$H\ C_U = A\ F_U + D\ G_U,$$

$$H\ C_M = A\ F_M + D\ G_M. \quad (19)$$

$C_M$ need not be cancelable and may include a delay factor. Combining the process equation (like 5) with the target equation (like 8) with the design equations 19 (like 10) to eliminate $e_U$ and D results in the combined feedback and feedforward control law (like 11 and 13):

$$u = (C_U r - G_U y)/(B\ F_U) - (G_M - F_M\ G_U/F_U)e_M/(B\ H). \quad (20)$$

The second ($e_M$) term is an additive feedforward correction. If $F_M\ G_U/F_U$ equals $G_M$, feedforward control is not capable or improving upon feedback performance. The $F_M\ G_U/F_U$ term represents the reduction, from the open-loop feedforward correction $G_M$, needed to prevent redundant (overcorrecting) contributions. $F_M$ can be made (nearly) zero, at least at low frequencies, when there is no more effective delay in the manipulated variable path D to the controlled variable y than in the measured disturbance path $C_M$. Then from 19, $G_M = H\ C_M/D$, because D is a factor of $C_M$. The measured disturbance $e_M$ is (almost) perfectly rejected with the feedforward correction, $u_{FF} = -C_M/(BD)\ e_U$, provided the controller output does not limit.

Feedforward provides a means for this single-output transfer function approach to be applied to a process with interacting loops. Unlike the state-space approach, it is necessary to associate each controlled variable with a particular manipulated variable. Then the effect of other manipulated variables on that controlled variable can be removed or reduced with feedforward corrections. This approach has the advantage that the appropriate compensation can be applied to active loops even when other loops are saturated or under manual control.

Furthermore, feedforward compensation may be structured to multiply the feedback correction. Multiplicative compensation is particularly effective for a temperature or composition loop manipulated with a flow. This configuration is intended to make the process appear more linear, as seen from the feedback controller; thus, the feedforward can be considered to provide gain scheduling for the feedback controller. Alternatively, the feedback controller can be viewed as adaptively tuning the gain of the feedforward compensator.

Other nonlinearities, even though they may involve the feedback variable, may be removable with additive or multiplicative feedforward-like corrections, [7]. For example, consider a nonlinear dominantly second-order process, such as a robot arm with negligible actuator delay and linkage flexibility. The process, $$g\{y\}\ d^2y/dt^2 + f\{y, dy/dt\} = u, \quad (21)$$

is controllable with u, when the functions f and g are known, $$u = f\{y, dy/dt\} + g\{y\}\ (K(r-y) - D_M\ dy/dt). \quad (22)$$

This control, shown in FIG. 2, achieves linear closed-loop response to set point r:

$$y = K\ r/(K + D_M s + s^2). \quad (23)$$

Here the proportional K and derivative $D_M$ feedback terms should be chosen to achieve desired closed-loop performance, taking the neglected effective delay and high frequency resonances into account, perhaps adaptively. If the K and $D_M$ terms can be made large compared with f/g, the closed loop performance may be quite insensitive to imperfect compensation for f. An integral term added to the PD controller would help to adapt the effective gain of the multiplicative g term. Dominantly first or zero order processes can be linearized similarly.

Multiple-Loop Control

A cascade of control loops, where the output of a primary (outer-loop) controller is the set point of the secondary (inner-loop) controller, may improve performance of the outer loop, particularly when the primary measurement responds relatively slowly. Nonlinearity, such as results from a sticking valve, and disturbances within the fast inner loop can usually be made to have little effect on the slow outer loop. Limits on the primary output constrain the set point of the secondary loop. Typical secondary controlled variables are valve position and flow. Jacket temperature may be the secondary variable for a batch reactor. The design of the primary controller should provide means of preventing integrator windup when the secondary controller limits or is in manual, [8].

Controllers also may be structured in parallel to provide a safety override of a normal control function. For example, the normal controlled variable may be a composition indicative of product quality. In an emergency, a pressure controller may take over its manipulated variable. This may be done by selecting the controller with the smaller (or larger) output or error to drive the manipulated variable. Means for preventing integrator windup of the unselected controller should be provided.

When there are multiple interacting controlled and manipulated variables, every controlled variable should be paired with a controller output, in order to make each control loop as insensitive as possible to the status of the others. Bristol's relative gain array (RGA) [9] can help in the evaluation of potential pairs. A good pair choice may result by considering some controller outputs to be the sum (or ratio) of measurable variables. Control is then implemented with a cascade structure. One of the summed (or ratioed) variables, acting as a feedforward, subtracts from (or multiplies) the primary output to get the secondary set point for the other variable. Again, means to prevent integrator windup, when the secondary saturates, should be provided.

For example, in distillation column control, FIG. 3, the distillate DF and reflux LF flows may be manipulated to control the distillate (impurity) composition and condenser level. Normally LF is much larger than DF. If LF and DF were the controller outputs, an RGA would show that the larger flow LF could be paired with level and DF with composition, [8]. However, if the composition controller adjusts DF/(LF+DF) and the level controller adjusts LF+DF, an RGA would indicate minimal interaction since the ratio has no effect on level when the sum is constant. In this case, the distillate set point is found by multiplying the composition controller output by the measured (LF+DF) and the reflux set point found by subtracting the measured DF from the level controller output. Dynamic compensation of the feedforward terms will not improve performance, since LF affects the composition with no more effective delay than DF.

The RGA is an array where each element $\Gamma_{ij}$ is a ratio of the sensitivities of a measurement $y_i$ to an output $u_j$, the numerator having all other outputs fixed and the denominator having all other measurements fixed. For the process:

$$A_1 y_1 = b_{11} D_1 u_1 + b_{12} D_2 u_2,$$

$$A_1 y_2 = b_{21} D_1 u_1 + b_{22} D_2 u_2, \quad (24)$$

where $A_i$ and $D_j$ are dynamic operators and $b_{ij}$ are constants, the RGA elements are also constants:

$$RGA = \left| \begin{array}{cc} \Gamma & 1-\Gamma \\ 1-\Gamma & \Gamma \end{array} \right|, \quad (25)$$

with only one interaction parameter $\Gamma$ (The number of interaction parameters is $(n-1)^2$, where n is the number of interacting loops, because each RGA row and column sums to 1.):

$$\Gamma = b_{11} b_{22}/(b_{11} b_{22} - b_{12} b_{21}). \quad (26)$$

When $\Gamma$ is between 0.5 and 2, $(u_1, y_1)$ and $(u_2, y_2)$ could be pairs. When $\Gamma$ is between $-1$ and 0.5 the opposite pairs could be used. Least interaction occurs when $\Gamma$ is 1 or 0, which happens when one of the $b_{ij}$ terms is zero. Values of $\Gamma$ smaller than $-1$ or larger than 2 indicate that neither set of pairs should be used, because the interaction is too severe. Saturating one of the loops, or placing it in manual, would change the gain in the other by more than a factor of 2.

When there is effective delay associated with each of the $b_{ij}$ terms (here $b_{ij}$ is not entirely cancelable), it is useful to compare the sum of the $b_{11}$ and $b_{22}$ delays with the sum of the $b_{12}$ and $b_{21}$ delays. If the interaction is significant ($\Gamma$ not within 0.2 of either 0 or 1) and the combination with the smaller delay sum does not confirm the pairing based on $\Gamma$, a different choice of controller output variables (using a decoupling feedforward compensation) may be indicated.

Disturbance Representation

If the disturbance is a Gaussian random variable, e is assumed to be a zero-mean white Gaussian noise source. Colored noise is assumed to result from stably filtering the white noise e. The filter moving-average (numerator) characteristic is included in the C polynomial and its autoregressive (denominator) characteristic is included in the A and B (or D) polynomials. The cross-correlation function of a linear filter's output with its input is equal to its impulse response convolved with the autocorrelation function of its input. When the input is white noise, its autocorrelation is an impulse function (the derivative of a step function). The cross-correlation is then equal to the filter's impulse response, [1,2,3].

Similarly, a deterministic disturbance may be considered to be the step or impulse response of a stable linear filter. A more complicated disturbance may be represented as the filter response to a sequence of steps (or integrated impulses). Any delay associated with an unmeasured disturbance is considered to determine the timing of the step, in order that $C_U$ be cancelable (stable zeros).

Pole-Placement Design

Pole-placement design [1] requires that A, B, C, and D be known and that a suitable H be selected. There may be difficulty in separating the B D product. As an expedient, B may be considered a constant and D allowed to include both stable and unstable zeros. If the degree of all of the polynomials is no greater than n, equation 10 provides $2n+1$ equations, one for each power of s or $z^{-1}$, to solve for the coefficients of F and G. If the unmeasured disturbance e is considered an impulse, the degree of the G polynomial should be less than that of A, otherwise the degrees may be equal.

A design resulting in a B or F polynomial with a nearly unstable zero, other than one contributing integral action, should probably be rejected on the grounds that its robustness is likely to be poor. It may be necessary to augment H with additional stable factors, particularly if the degree of F or G is limited. The set point can be prefiltered to shift any undesired poles in the set-point function D/H to a higher frequency. However, the resulting uncompensatable unmeasured-load rejection function F/H may be far from optimal.

Linear-Quadratic Design

LQ design [1] provides a basis for calculating the H and F polynomials, but is otherwise like the pole-placement approach. In this case, D contains both the stable and unstable zeros and B is a constant. C/A is an impulse response function, since e is specified to be an impulse. The H polynomial, which contains only stable zeros, is found from a spectral factorization of the steady-state Riccati equation:

$$\sigma H\{z\}H\{z^{-1}\} = \mu A\{z\}A\{z^{-1}\} + D\{z\}D\{z^{-1}\},$$

or $$\sigma H\{s\}H\{-s\} = \mu A\{s\}A\{-s\} + D\{s\}D\{-s\}. \quad (27)$$

The parameter $\sigma$ is chosen to make the steady-state value of H unity and $\mu$ is an arbitrary parameter in the criterion function J, $$J = E\{(r-y)^2 + \mu u^2\}. \quad (28)$$

E is the expectation operator. The u term imposes a soft constraint on the manipulated variable with a penalty factor $\mu$. A polynomial X, satisfying:

$$X\{z\}\ A\{z^{-1}\}+\sigma\ H\{z\}\ G\{z^{-1}\}=D\{z\}\ C\{z^{-1}\},$$

$$X\{z\}\ H\{z^{-1}\}+\mu\ A\{z\}\ G\{z^{-1}\}=D\{z\}\ F\{z^{-1}\}, \quad (29)$$

and 27 also satisfies 10 and minimizes 28 for an impulse disturbance e. The equations in s are similar. When the degree of A is n, the first equation of 29 provides 2n equations, one for each power of z (or s). These can be solved for the 2n unknown coefficients of X and G, after H and a are found from 27. G has no n'th degree coefficient and X{z} and D{z} have no zero degree coefficient. (X{−s} and D{−s} have no n'th degree coefficient.) None of the polynomials is more than n'th degree. F can then be found by polynomial division from 10 or the second of 29.

For the optimization to be valid, the penalty factor $\mu$ must be large enough to prevent the manipulated variable u from exceeding its limits in responding to any input. However, if $\mu$ were chosen to be too large, the closed-loop response could be as sluggish as the (stabilized) open-loop response. The LQ problem may be solved leaving $\mu$ as a tuning parameter. Either experiments or simulations could be used to evaluate its effect on performance and robustness.

Despite the LQ controller being optimal with respect to J for a disturbance input, a switching (nonlinear) controller, that takes into account the actual manipulated variable limits and the load, can respond to a step change in set point r in less time and with less integrated absolute (or squared) error.

Minimum-Time Switching Control

The objective for the switching controller is to drive the controlled variable y of a dominant-lag process from an arbitrary initial value so that it settles at a distant target value in the shortest possible time. The optimal strategy is to maintain the manipulated variable u at its appropriate limit until y nears the target value r. If the process has a secondary lag, driving u to its opposite limit, for a short time, will optimally slow the approach of y to r, where it will settle after u is stepped to the intermediate value q needed to balance the load. Until the last output step, switching control is the same as "bang-bang" control. Determination of the output switching times is sufficient for open-loop control. The switching criteria must be related to y and its derivatives (or the state variables) in a feedback controller. Either requires solving a two-point boundary-value problem.

As an example, consider a linear integral {T}-lag($\tau_L$)-delay{$\tau_D$} process with constant manipulated variable (controller output) u. The general time domain solution has the form:

$$x\{t\}=a\ t+b\ \exp\{-t/\tau_L\}+c,$$

$$y\{t\}=x\{t-\tau_D\}. \quad (30)$$

where x is an unmeasured internal variable and a, b, and c are constants that may have different values in each of the regimes. At time zero, the controlled variable y is assumed to be approaching the target value r from below at maximum rate:

$$dy\{0\}/dt=dx\{0\}/dt=(u_M-q)/T=a-b/\tau_L,$$

$$x\{0\}=b+c,$$

$$y\{0\}=x\{0\}-(u_M-q)\tau_D/T, \quad (31)$$

where $u_M$ is the maximum output limit and q is the load. At that instant, the output is switched to the minimum limit, assumed to be zero. If the next switching were suppressed, x and y would eventually achieve their negative rate limit, $$dy\{\infty\}/dt=dx\{\infty\}/dt=-q/T=a.$$

Combining with 31 to eliminate a:

$$b=-u_M\tau_L/T,$$

$$c=x\{0\}-b. \quad (32)$$

At time $t_1$, x reaches the target value r with zero derivative.

$$dx\{t_1\}/dt=0=-q/T+(u_M/T)\exp\{-t_1/\tau_L\},$$

$$x\{t_1\}=r=x\{0\}-q(t_1+\tau_L)/T+u_M\tau_L/T. \quad (33)$$

Consequently, $$t_1=\tau_L\ \ln\{u_M/q\}, \quad (34)$$

and switching from maximum to zero output occurred when:

$$r-y\{0\}-(\tau_D+\tau_L-t_1\ q/(u_M-q))\ dy\{0\}/dt=0. \quad (35)$$

If q is zero, as it may be when charging a batch reactor, the q $t_1$ product is zero, even though $t_1$ is infinite.

Optimal switching, from zero output to that required to match the load q, occurs at time $t_1$. If $t_1$ is less than the delay time $\tau_D$:

$$r-y\{t_1\}-(\tau_D+\tau_L-t_1\ u_M/(u_M-q))\ dy\{t_1\}/dt=0, \quad (36)$$

otherwise:

$$r-y\{t_1\}-(\tau_L-\tau_D/(\exp\{\tau_D/\tau_L\}-1))\ dy\{t_1\}/dt=0. \quad (37)$$

The controlled variable y will settle at the target value r at time $t_1+\tau_D$. At this time the switching controller could be replaced by a linear feedback controller designed to reject unmeasured load disturbances and correct for modelling error. This combination of a switching controller with a linear controller, called dual mode, may be used to optimally startup and regulate a batch process, [9].

Minimum-Variance Design

The minimum-variance design is a special case of the LQ approach where $\mu$ is zero. This may result in excessive controller output action with marginal improvement in performance and poor robustness, particularly when a small sampling interval h is used. Performance is assumed limited only by the non-minimum phase (unstable) zeros and delay included in D. The H polynomial contains the stable zeros and the reflected (stable) versions of unstable zeros of D.

When D is a k time-step delay and e is considered an impulse, the minimum variance solution for $F\{z^{-1}\}$ and $G\{z^{-1}\}$ can be found from 10 by polynomial division of H C by A. $F\{z^{-1}\}$ consists of the first k−1 quotient terms. The remainder (H C−A F) is D $G\{z^{-1}\}$. From 27, H is unity. However, if H is arbitrarily assigned, this design becomes pole placement.

As a minimum-variance example, consider D to be a delay. Again, H is unity. The disturbance e is assumed to be a step applied downstream of the delay. C is unity. B is a gain b. The A polynomial represents a kind of lag:

$$A = 1 - a\,D. \tag{38}$$

In one delay time the controlled variable can be returned to the set point r, hence $F = 1 - D$. Equation 10 becomes:

$$1 = (1 - a\,D)(1 - D) + D\,G. \tag{39}$$

Solving for G:

$$G = 1 + a - a\,D, \tag{40}$$

and the controller from equation 13 becomes:

$$u = ((r - y)/(1 - D) = a\,y)/b. \tag{41}$$

When the delay is one computing step h, the process can be considered a sampled first order lag, with time constant $h/\ln\{1/a\}$, and a zero-order hold. Equation 41 has the form of a digital PI controller with proportional band PB=b/a, and integral time IT=a h. When a is one, the process can be considered a sampled integral, with time constant h/b, and a zero-order hold. When a is zero, the process is a pure delay and the controller is "floating" (pure integral, PB IT=b h). The controlled variable y has dead beat response in one time step for either a set-point or load step, $$y = D\,r + (1 - D)\,e. \tag{42}$$

The response is also optimum with respect to the minimum largest absolute error and the minimum integrated absolute error (IAE) criteria.

When the delay has k time steps, the $F = 1 - D$ factor in the controller equation has k roots equally spaced on the unit circle. One provides infinite gain at zero frequency (integral action). The others make the controller gain infinite at frequencies that are integer multiples of 1/(k h), not exceeding the Nyquist frequency ½h. These regions of high gain cause the loop stability to be very sensitive to mismatch between the actual process delay and k h used in the controller, As k approaches infinity, the robustness index approaches zero, indicating no tolerance of delay mismatch. A low-pass filter, that improves the robustness by attenuating in these regions of high gain, also degrades the nominal performance.

The control loop may be structured as two loops, the outer-loop integral controller providing the set point $r_I$ to the inner-loop proportional controller.

$$r_I = (r - y)/(1 - D) = r - y + D\,r_I \tag{43}$$

and $$u = (r_I - a\,y)/b. \tag{44}$$

The effect of closing only the inner loop is to create a delay process as seen by the outer-loop controller.

$$y = D\,r_I + e. \tag{45}$$

The outer-loop controller can be considered model feedback in relation to the closed inner loop, since the difference between the controlled variable's measured (y) and predicted (D $r_I$) values is fed back as a correction to an open-loop (unity gain) controller.

Model-Feedback Control

Model-feedback control, whose variations include Smith predictor, Dahlin, Dynamic Matrix, Model Predictive (unless a special unmeasured disturbance model is used [10]), etc., consists of an open-loop controller with a feedback correction equal to the model prediction error. If model-feedback control is applied, without first closing a proportional inner loop, there results:

$$u = (A/(BH))(r - (y - (BD/A)u)), \tag{46}$$

$$y = (D/H)\,r + (1 - D)(C/(AH))e. \tag{46}$$

assuming no process-model mismatch and no unstable zeros of A. H is a filter chosen to improve robustness. For the above process, assuming H to be unity, the response to a step disturbance can be easily calculated by polynomial division:

$$\begin{aligned}F &= (1 - D)(C/A) = (1 - D)/(1 - a\,D) \\ &= 1 - (1 - a)D\,(1 + (a\,D) + (a\,D)^2 + (a\,D)^3 \ldots).\end{aligned} \tag{47}$$

The maximum error occurs during the first delay interval when $F\{0+\}$ is 1. After n delay steps $F\{n+\}$ is reduced to $a^n$. Even though this result is optimum with respect to the minimum largest absolute error criterion, the recovery from a load upset can be very slow when a is close to one (or divergent, when a is greater than one). The ratio of the integrated absolute error (IAE) to the optimum is $1/(1-a)$. Consequently model-feedback control may not adequately reject an unmeasured load disturbance, when the process has a dominant lag (a near 1), unless well chosen inner loop feedback is applied or the model deliberately mismatches the process, as recommended in [6]. However, design of the inner-loop controller or the model mismatch, for near optimal load rejection, may require more detailed high-frequency knowledge (for example, a spectral factorization of process polynomials) than is necessary for selecting an output trajectory (open-loop controller) to achieve good set-point tracking.

The stability of a tightly tuned matched-model-feedback loop is very sensitive to mismatch between the model and process delays. To achieve adequate robustness, it may be necessary to detune the controller with H, further sacrificing unmeasured-load rejection capability, Without the inner loop or deliberate model mismatch, early return of the output from saturation may cause excessively slow controlled-variable response of a dominant-lag process to a large set-point step. As with open-loop control, an on-line nonlinear optimizer may be used to avoid this sub-optimal behavior.

Algebraic PID Design

In this section a two phase method for applying equation 10 to the design of analog (or fast-sampling digital) PID controllers is described. Unlike Bode and root-locus design methods, this method allows all of the controller parameters as well as the closed loop performance parameters (time scale and load sensitivity) to be found directly, without trial and error.

The process is represented with an A polynomial in s. B, D and C are assumed 1. The inverse of a delay or small numerator Zero factor (if representable as a convergent Taylor series up to the frequency range critical for stability) is included in the A polynomial.

$$(a_0+a_1s+a_2s^2+a_3s^3+\ldots)y=u+e. \quad (48)$$

A large stable zero is unusual and requires special consideration. It should be approximately cancelled by a controller or process pole. Such a pole is not available from a PID controller. However, an effective process cancellation, without a factorization, may result by disregarding the zero order terms of both the process numerator and denominator before determining A by polynomial division. When the process zero and pole are sufficiently dominant, mismatch in zero order terms, which affects the very low frequency behavior, will be corrected by high controller gain in that frequency range.

This two phase design process implicitly imposes the performance limitation that would normally be imposed by including delay and non-minimum phase zeros in D. The first design phase prevents inner-loop feedback when the open-loop process already approximates a pure delay. This is done by selecting the inner-loop gain arid derivative terms, $$G_I = K_M + D_M s, \quad (49)$$

to make the closed inner loop ($H_I^{-1}$) approximate a delay at low and moderate frequencies. As many low order terms of equation 10 are matched as are needed to determine the unknown controller and performance parameters.

The $H_I$ polynomial is chosen to be the Taylor-series expansion of an inverse delay, whose time $\tau_I$ and gain $h_0$ is to be determined:

$$H_I = h_0 (1 + \tau_I s + (\tau_I s)^2/2 + (\tau_I s)^3/6 + \ldots). \quad (50)$$

When $F_I$ is chosen as 1 (instead of choosing $h_0$ as 1), equation 10 gives:

$$H_I = A + G_I. \quad (51)$$

The limited-complexity inner-loop PD controller can significantly influence only the low-order closed-loop terms and hence can shape only the low-frequency closed-loop behavior. Only the most dominant two poles (lowest in frequency) of the open-loop process may be unstable, since only they can be stabilized with proportional and derivative feedback. As a result the limiting closed-inner-loop performance measures, the values of $\tau_I$ and $h_0$, are determined by $a_2$ and $a_3$, provided the latter have the same sign. Equating term-by-term and rearranging gives:

$$\tau_I = 3\, a_3/a_2,$$

$$h_0 = 2\, a_2/\tau_I^2,$$

$$D_M = h_0\, \tau_I - a_1,$$

$$K_M = h_0 - a_0. \quad (52)$$

When the sign of $D_M$ is different from that of $K_M$, or derivative action is not desired, the parameters should be calculated with:

$$\tau_I = 2\, a_2/a_1,$$

$$h_0 = a_1/\tau_I,$$

$$D_M = 0,$$

$$K_M = h_0 - a_0. \quad (53)$$

For a pure delay process, both $K_M$ and $D_M$ are zero. The closed inner loop becomes:

$$y = (r_I + e)/H_I. \quad (54)$$

The outer loop uses gain and integral terms applied to the error:

$$r_I = (1/(I_E s) + K_E)(r - y). \quad (55)$$

Using this equation to eliminate $r_I$ from the previous gives:

$$(1 + I_E s(K_E + H_I))y = (1 + K_E I_E s)r + I_E s\, e. \quad (56)$$

The target closed-loop set-point behavior is chosen to approximate a nonovershooting delay-like model, n equal lags. The shape parameter n and the time constant $\tau_O$ are to be determined as are the controller parameters, $K_E$ and $I_E$:

$$(1 + \tau_O s/n)^n\, y = r + I_E s\, e/(1 + K_E I_E s). \quad (57)$$

Equating term-by-term and solving the four simultaneous equations gives:

$$n = 10.4,$$

$$\tau_O = 1.54\, \tau_I,$$

$$K_E = 0.198\, h_0,$$

$$I_E = \tau_O/h_0. \quad (58)$$

A small value of $I_E$ is desirable because its product with the output change is equal to the integrated error response to a load change. Since the controller is designed to achieve very small overshoot, The product is also nearly equal to the integrated absolute error (IAE) for a step load change. If the response shape parameter n were made infinite (corresponding to a pure delay target) instead of matching the fourth degree terms, there would result a faster but more oscillatory and less robust response (with near minimum IAE for a load step). Then the closed loop time constant $\tau_O$ would become $1.27\, \tau_I$ and $K_E$ would equal $0.289\, h_0$. Equation 58 still would apply for $I_E$.

The resulting controller is a four term noninteracting (sum-of-terms) type. The following equations may be used to convert these tuning values to those for a conventional three-term PID interacting (product-of-factors) type, adjusted for good load rejection:

$$K = K_E + K_M. \quad (59)$$

If $K^2$ is greater than four times the ratio of $D_M$ to $I_E$:

$$1/PB = 0.5(K + (K^2 - 4D_M/I_E)^{0.5}),$$

$$IT = I_E/PB,$$

$$DT = D_M\, PB, \quad (60)$$

otherwise $$PB = 2/K,$$

$$IT = DT = (I_E D_M)^{0.5}. \quad (61)$$

To achieve the designed set-point response also, the set-point input should be applied to the controller through a lead-lag filter. The lag time is matched to the integral time IT. The ratio of lead-to-lag time ($\alpha$) is made equal to $K_E$ PB. The resulting controller equation is:

$$u = ((1+\alpha ITs)r - (1+ITs)(1+DTs)y)/(PB\ ITs). \quad (62)$$

Derivative action is applied only to the controlled measurement, not to the set point. To prevent excessive valve activity at frequencies beyond the closed loop bandwidth, it is customary to condition the controlled measurement y with a low-pass filter whose time constant is a small fraction ($\approx 0.1$) of the derivative time DT. In order that the sampling process of a digital controller not further diminish the effectiveness of the derivative term, the sampling interval should be less than the effective filter time.

For example, consider a thermal process with a 300 sec. lag and a 10 sec. effective delay. The algebraic design gives an integral time IT=24 sec., derivative time DT=3.6 sec., and the closed-loop time constant $\tau_O$=23.1 sec., all more sensitive to the delay than the lag. The sampling interval should not exceed 0.4 sec. in order not to compromise closed-loop performance. This is a surprisingly small interval, considering the relatively slow open-loop response.

Anti-Alias Filtering

When an analog signal contains a component with frequency higher than the Nyquist frequency (half the sampling frequency $f_S$), the sampled signal component appears to have a frequency less than the Nyquist frequency as shown in FIG. 4. If the analog signal component frequency f lies between odd integers (2n−1) and (2n+1) times the Nyquist frequency, $$(n-0.5)f_S \leq = f < (n+0.5)f_S, \quad (63)$$

the sampled signal component has the same amplitude but appears to be shifted to the frequency $|f - n\ f_S|$. This frequency shifting is called aliasing, [1].

To achieve good performance with digital control, it is necessary to sample the controlled variable at a rate faster than twice the highest frequency significant for control and to attenuate, before sampling, components with higher than Nyquist frequency. This should be done with minimum attenuation or phase shifting of the lower frequency components that are important for control.

It is particularly important to remove, before sampling, a signal component that is an integer multiple of the sampling frequency, because this component would shift to zero frequency causing a steady-state offset error. An analog filter, that averages between sampling instants, removes such components completely. This filter can be realized with an analog-to-frequency converter and a sampled digital counter. The longer the sampling interval, the higher is the count and the greater is the digital signal resolution.

However the analog averaging filter does not attenuate sufficiently near the Nyquist frequency. A stage of digital filtering, a two-sample average, completely removes a Nyquist-frequency component in the sampled signal. Its passband is flatter and its cutoff is sharper than those of a digital Butterworth (autoregressive) filter having the same low-frequency phase (effective delay).

This measurement anti-alias filter together with the manipulated variable zero-order hold adds an effective delay of 1.5 h to the analog process. Calculation delay, which may be as large as the sampling interval h, is additional. Consequently, the sampling interval should be small compared with the effective delay of the process, in order that feedback loop performance (unmeasured-load rejection) not be compromised. On the other hand, resolution is improved by averaging over a longer sampling interval.

An anti-aliasing filter removes or diminishes the effects of higher than Nyquist frequency process signals on the digital measurements. However, digital outputs apply a sequence of steps to the process that may excite a higher than Nyquist-frequency open-loop resonance (such as water hammer). This effect will be accentuated in high performance loops with large output steps and in loops where the resonance is synchronized with a multiple (harmonic) of the output update frequency.

Adaptive Control

Time-varying or nonlinear process dynamics, variable operating conditions, slow response to upsets, dominant unmeasured disturbances, performance degradation resulting from deliberate upsets, and lack of tuning expertise are all reasons to consider adaptive (self-tuning) control. Economic incentives may result from improved control of product quality and yield, a higher production rate, less energy usage, improved plant safety, and less pollution.

Adaptive control schemes may be classified according to several design alternatives. Associated with each of these are concerns that should be addressed in order to assure robust adaptation.

First, the adaptor may be open or closed loop. An open-loop adaptor programs the controller tuning based upon a model of the process. The model may be fixed and nonlinear (such as a neural net) or time varying and linear, with parameters updated to reconcile measured process inputs and outputs. Mismatch between the model and the process may be caused by misidentification as a result of large non-stationary unmeasured disturbances, insufficiently rich inputs, or by model structural deficiencies. Mismatch may lead to inappropriate controller tuning that will not be corrected until (or unless) the model is revised. For example, even though the effective process delay limits how tightly the controller can be tuned, the model delay may be assigned arbitrarily (it is not easily identified) or the process delay masked by a larger sampling interval. On the other hand, a closed-loop adaptor monitors one or more performance measures for the closed control loop and adjusts controller parameters to drive these measures to target values. Desired performance is assured when the feedback adaptor converges. Its issues include the rate of convergence and the robustness of the adaptive loop.

Second, the adaptation may be based on observations of responses to deliberate or natural disturbances. For example, a performance optimizing adaptor, using a hill climbing strategy, requires the comparison of process performance measures for responses to identical, hence deliberate, disturbances. However, a deliberate disturbance degrades a well-tuned loop's performance. Therefore deliberate upsets should be applied infrequently and only when there is high likelihood that the controller is mistuned and is not likely to recover soon. A deliberate disturbance, has the advantage that it is known and can be made large enough to dominate unmeasured disturbances and rich enough to excite important process modes. On the other hand, natural disturbances may be unmeasured and nonstationary, often consisting of significant isolated filtered step-like events and low-level noise. However, a response to a natural disturbance may contain incomplete information to observe all process modes and make an unambiguous adaptation.

Third, the target control-loop time scale may be fixed or optimal. One may choose to drive the closed loop performance to that of a fixed model, as is done with pole-placement, fixed model-delay minimum-variance, or model-reference adaptors. A fixed time scale for all operating conditions must be user-selected to be as large as the largest minimum, and hence sub-optimal for other operating conditions. Extensive knowledge of the process dynamics helps in choosing the time scale. Alternatively, the control-loop time scale may be adapted in an open-loop minimum-variance adaptor by updating the effective delay time, or in a performance-feedback adaptor by choosing response shape parameters that are sensitive to the relative positions of the three (or more) most dominant closed-loop poles. On the other hand, a tightly tuned controller may not have an adequate stability margin, particularly if the (nonlinear) process may experience sudden large unmeasured load changes.

Fourth, the adaptations may be performed continuously, with updates each sampling interval, or aperiodically, following the response to each significant disturbance. When the controller tuning is updated each sampling instant, the update must recursively take into account a portion of past history. Over this time interval, both the process parameters and the statistical measures of unmeasured disturbances are assumed to be stationary. However real processes may be subjected to minimal lead changes for extended intervals and to large unmeasured nonstationary load changes at other times. This makes choosing an adequate time interval difficult, particularly when effective adaptation requires that a time-varying linear model track a nonlinear process. On the other hand, an adaptive scheme designed to update controller parameters following significant isolated disturbance responses, must also cope with cyclical and overlapping responses. It should distinguish between a loop instability, a stable limit cycle, and a cyclical disturbance.

Cycling can also be a problem for an adaptor based on model identification, because the signals may provide incomplete information for identifying more than two process parameters. An incorrect identification may lead to worse controller tuning. Furthermore, if the cycle amplitude is large, it may be impractical to make the identification unique by superimposing sufficiently significant deliberate disturbances.

An event-triggered adaptor provides an additional opportunity: the state and measured inputs, existing at the moment a new disturbance is sensed, can be used to select among several sets of stored tunings to determine the set to be used during, and updated following, the response interval. This capability (like gain-scheduling and multiplicative feedforward compensation) enables the controller to anticipate and compensate for the effect of process nonlinearity.

Three types of adaptive controllers will be discussed. First is the performance-feedback type, using expert system rules to cope with incomplete information, and using nonlinear dead-beat adaptation when information is complete. The second is an open-loop type that uses a recursive parameter identifier to update the parameters of a difference equation model. The controller is tuned as if the model were the process, thus invoking the "certainty equivalence" principle. Third is another open-loop type. This one identifies the low order parameters of a differential equation model in order to update the coefficients in a feedforward compensator. It uses the moment-projection method on each isolated response.

Other types of adaptors, including the model reference type, may be more suitable for set-point tracking than for unmeasured load rejection. For example, the extended-horizon type uses a nonlinear optimizer to determine an open-loop controller's constrained output trajectory. The controlled-variable trajectory must be optimized over a prediction interval that exceeds that of the output by the process delay time. An extended-horizon optimizer can be used in conjunction with predictive-model feedback, useful (as explained earlier) for load rejection with a dominant-delay process and for model mismatch correction with set-point tracking. The nonlinear optimization calculations may require a large time step that compromises control loop performance with additional effective delay. Also, a linear moving-average process model may have so many degrees of freedom that on-line identification is impractical, both because the computational load is excessive and because a reasonable interval of natural-signal history does not persistently excite all of the model and process modes. A fixed nonlinear neural-net model may be more practical for a time invariant process, even though its programming requires training with extensive signal records spanning the range of expected operating conditions.

Performance-Feedback Adaptor Using Pattern Recognition and Expert Systems

A performance feedback adaptor (such as Foxboro's Exact) monitors a single loop variable, control error, [11]. Since the set point and process measurement are known, the controller output does not contain independent information, because it is determined by the controller equation. Pattern features are measured of the error response to a significant (typically unmeasured) disturbance. When enough of the response has been observed, the controller parameters are adjusted in order to make the feature values of the next response approach target values.

A significant error event is detected when the absolute control error exceeds a set threshold. The threshold value is chosen large enough so that an error event will not be triggered by low level process or measurement noise. Since error peaks are the most prominent features of an oscillatory response, peak amplitudes and times are sought. Expert system (heuristic) rules may be used to distinguish response peaks from noise peaks.

Zero-to-peak ($-E_2/E_1$) and peak-to-peak ($E_3-E_2$)/($E_1-E_2$) error amplitude ratios may be chosen as shape features. These are independent of the response amplitude and time scales and are called overshoot and decay respectively. Target values for these ratios may be chosen to minimize a criterion function, such as minimum integrated absolute error IAE, for a specific process and disturbance shape. The ratio of times between peaks is not recommended as a controlled shape feature, because it is relatively sensitive to nonlinearity and noise and insensitive to the relative location of closed-loop poles.

The second and third peaks, $E_2$ & $E_3$, do not exist for an overdamped response. In this case a "knee" (or quasipeak, defined by "expert" criteria) is sought to determine a response time scale used to terminate the peak search and to estimate the (negative) effective overshoot, Decay is zero in this case.

If the error response were a damped quadratic function, the first three error peaks $E_i$ are related $$E_1 E_3 = E_2^2 \text{ and decay} = \text{overshoot.} \tag{64}$$

This response, like the overdamped response, does not contain complete information for controller tuning, [12]. A response containing both lag and underdamped quadratic terms provides complete information for tuning a FID. For the response:

$$E\{t\} = \alpha\, e^{-at} + \beta e^{-bt} \cos\{wt\}, \tag{65}$$

three shape ratios, $\beta/\alpha$, b/a, and b/w, provide sufficient information to update three controller parameters, PB, IT, and DT. However, if either $\alpha$ or $\beta$ were 0, values of (a) or (b and w) would be unmeasurable and the information incomplete. It is desirable that the features used for adaptation reflect the relative pole positions indicated by the last two ratios, because the dominant error poles are usually closed-loop poles. Furthermore, the features should be insensitive to the first ratio, $\beta/\alpha$, because this ratio is sensitive to the unmeasured disturbance shape and point of application, as indicated by the relative location of the error signal zeros.

When information is complete from the error response to a load step applied upstream of a dominant lag or delay, $$E_1 E_3 > (E_2)^2 \text{ and decay} > \text{overshoot.} \tag{66}$$

This corresponds to the lag ($\alpha$) and quadratic ($\beta$) terms making contributions of the same sign to the first peak.

These inequalities can be reversed if the disturbance has a different shape or is applied at a different location. Reversal would result if the disturbance were a narrow pulse or if it were a step applied downstream of a dominant lag.

Reversal also would result if the disturbance were statically compensated by a feedforward controller and could result if the disturbance were to affect interacting loops. The final part of this type of error response has a shape similar to the "usual" response so that, when the first peak (or peaks) is discarded and the remaining peaks renumbered, decay becomes greater than overshoot.

Peak shifting desensitizes the pattern features to open-loop and disturbance-signal zeros while maintaining sensitivity to the relative positions of the three most dominant error-signal poles. These poles usually are the closed-loop poles, but may include the poles of the disturbance signal, if the disturbance is not suddenly applied.

The changes in the controller-parameter vector P are computed from the deviation of the measured-feature vector F from its target-value vector $F_t$, according to the adaptor's nonlinear-gain-function matrix G.

$$P\{i+1\} = P\{i\} + G\, (F_t - F\{i\}). \tag{67}$$

The response feature vector $F\{i\}$ (measured after the i'th response), is a nonlinear-function of the controller parameter vector $P\{i\}$ (existing during the i'th response), the process type, and disturbance shape. For a given process and disturbance shape, simulation was used to map feature deviations as a function of control parameter deviations $\delta F/\delta P$, allowing feature deviations to be predicted with:

$$F\{i+1\} = F\{i\} + (\delta F/\delta P)(P\{i+1\} - P\{i\}). \tag{68}$$

If the unique inverse of the function matrix $\delta F/\delta P$ exists, the latest response contains complete information. Then a dead-beat adaptation ($F\{i+1\} = F_t$) is possible with:

$$G = (\delta F/\delta P)^{-1}. \tag{69}$$

This multivariable adaptive loop is quite robust, being particularly tolerant of smaller than optimum G. For example, if the optimum G is multiplied by a factor ranging between 0 and 2, the adaptive loop will remain stable. The eigenvalues of the $(I - (\delta F/\delta P)G)$ matrix, nominally located at the origin of the complex z plane, must stay within the unit circle.

If the process were a lag-delay, a process-type variable, sensitive to the ratio of the lag-to-delay times, could be used to interpolate between the two extremes. The ratio of the controller integral time to response half-period is an indicator of process type when decay and overshoot are fixed. This property may be used to identify the process type. The optimal integral to half-period ratio (IT/T) is smaller for the pure delay than for the integral delay.

When only two features, such as overshoot and decay, reliably characterize a response shape, only two controller parameters (proportional band PB and integral time IT of a FID controller) are determined through performance feedback. However, because the optimal derivative-to-integral ratio is also a function of process type, the derivative term (DT) can be calculated, after IT and the process type have been determined.

The process type, proportional-band ratio, $PB/PB_t$, and the integral-time ratio, $IT/IT_t$, are determined by interpolating stored data from performance maps for the process type extremes, given overshoot, decay, IT/T, and DT/IT. The half-period T and the controller parameters PB, IT, and DT are values for the latest response. $PB_t$ and $IT_t$ are the newly interpolated values of the controller parameters predicted to produce the target features on the next response.

When the error-shape information is incomplete, as when the response is overdamped, quadratic, non-isolated, or nonlinear (because the measurement or controller output has exceeded its range), expert system rules are used to improve the controller tuning. These rules, of the IF-THEN-ELSE type, invoke a special strategy for each of these contingencies. Several retunings may be needed before a response shape contains sufficient information to achieve the desired performance on the next response. Even when the information is incomplete, robust tuning rules are possible, provided derivative action is not essential for stabilizing the control loop.

A non-isolated response is recognized if its start is detected while waiting for the last response to settle. A non-isolated response may be caused by the failure of the preceding response to damp quickly enough. If the decay of a non-isolated response is sufficiently small, even though it may be bigger than the target, the existing tuning is retained. Typically a continuing oscillation will be dominated by a quadratic factor, giving rise to incomplete information for retuning.

A non-isolated response may also be caused by a rapid sequence of load changes, the next occurring before the response to the last has settled. Peak shifting tends to desensitize the adaptor to a strange sequence of peaks, allowing detuning only when a conservative measure of decay is excessive.

A marginally stable loop is distinguished from a limit cycle or response to a cyclical load by observing the improvement in decay caused by an adaptive retuning. If retuning fails to reduce the decay measure, the last successful tunings may be restored and adaptation suspended until settling or an operator intervention occurs.

Open-Loop Adaptation Using Discrete-Model Identification

Adaptation of a feedback controller based on an identification of an input-output process model is most effective when the important process inputs are measured and (at least partially) uncorrelated with one another. An unmeasured disturbance is assumed to come from a stationary filtered white Gaussian-noise source uncorrelated with the measured inputs. When a large unmeasured disturbance violates this assumption, the identified model may be a poor match for the process and poor controller tuning may result. Process-model mismatch may also result when the disturbance fails to independently excite process or model modes, a condition called non-persistent excitation. A poor model structure, such as one having an incorrect unadapted delay or insufficient model degrees of freedom, may also cause mismatch that leads to poor control. Coefficients for a model having both linear and nonlinear terms may not be uniquely identifiable, if the process input and output changes are small.

Two types of models may be identified, called explicit and implicit. An explicit model relates the process inputs and output with parameters natural to the process such as equation 5. The explicit model is most useful for design of an open-loop or model-feedback controller. A complicated design process involving equation 10 would be needed to compute the feedback controller parameters of equation 13. An implicit model combines the target equation 8 and the feedback control equation 13, so that the parameters needed for control are identified directly. In either case the identification model may be put in the prediction form:

$$\Omega\{t+k\}=\Phi\{t\}^T\Theta+\epsilon\{t+k\}, \tag{70}$$

which predicts the value of $\Omega$, k time steps ahead, given present and past values of the process inputs and outputs concatenated in the vector $\Phi$. $\Theta$ is a corresponding vector of parameters determined by the identifier. $\epsilon$ is the identification error.

For the explicit model, $$A\,y=DB\,u+C\,e+e_0. \tag{71}$$

Here, $e_0$ is the steady-state offset and $$A=1+a_1\,z^{-1}+\ldots,$$

$$C=1+c_1\,z^{-1}+\ldots,$$

$$B=b_0+b_1\,z^{-1}+\ldots. \tag{72}$$

The time step h is assumed to be one time unit. The time step should be chosen small enough that the anti-alias filter, the digital computation, and the output hold do not dominate the effective delay, but large enough that roundoff or data storage do not cause difficulty. Here D is assumed to be a known and fixed k time step delay. The value of k must be large enough that B is stably cancelable. Of course, other choices for D are possible. The prediction model variables become:

$$\begin{aligned}&\Omega\{t\}=y\{t\},\\&\Phi\{t-1\}^T=[u\{t-k\},\ldots,-y\{t-1\},\ldots,\\&\quad\epsilon\{t-1\},\ldots,1],\\&\Theta^T=[b_0,\ldots,a_1,\ldots,c_1,\ldots,e_0].\end{aligned} \tag{73}$$

If the model matched the process exactly, the prediction error $\epsilon\{t\}$, which is uncorrelated with the variables in $\Phi\{t-1\}$, would equal the white noise disturbance $e\{t\}$. In order to identify C, past values of the prediction error are needed, but these can not be found until $\Theta$ is identified. This difficulty can be overcome by solving for $\Theta$ recursively. When $\Theta$ is updated each time step, $\epsilon\{t\}$ can be calculated using the most recent $\Theta$. C must be constrained to have stable zeros. An algorithm that identifies C is said to be "extended". When $\Phi$ and $\Omega$ are prefiltered by $C^{-1}$, the algorithm is "maximum likelihood". If the identifier inputs are prefiltered by $E^{-1}$, $(E/C)-0.5$ must be positive real in order to be certain $\Theta$ can converge to its true value, [13]. Convergence also requires no structural mismatch.

The model form for implicit identification uses the target equation 8 to eliminate $r\{t-k\}$ from the controller equation 13:

$$Hy\{t\}=BFu\{t-k\}+Gy\{t-k\}-C'r\{t-k-1\}+e_0+Fe\{t\}, \tag{74}$$

where $C'=C-1$ and D is a k step delay (h−1), the prediction model variables become:

$$\Omega\{t\}=H\,y\{t\}=h_0\,y\{t\}+h_1\,y\{t-1\}+\ldots, \tag{75}$$

where H is specified.

$$BF=\beta_0+\beta_1\,z^{-1}+\ldots,$$

$$G=\alpha_0+\alpha_1\,z^{-1}+\ldots,$$

$$\Phi\{t-k\}^T=[u\{t-k\},\ldots,y\{t-k\},\ldots,-r\{t-k-1\},\ldots,1]$$

$$\Theta^T=[\beta_0,\ldots,\alpha_0,\ldots,c_1,\ldots,e_0]. \tag{76}$$

To identify the C polynomial, the set point r must be active, the updated control law implemented, and a recursive algorithm used. C must be constrained to have stable zeros. Also, k must be large enough that the zeros of BF are stable. If the model matched the controlled process exactly, the modeling error $\epsilon\{t\}$, which is uncorrelated with any of the variables in $\Phi\{t-k\}$, would equal the closed loop noise response F $e\{t\}$. If H is 1, this implies a minimum variance design, otherwise pole placement.

The same positive real and structural consistency requirements apply for convergence of an implicit parameter set as apply for the explicit set. The positive real condition assures that the component of control error Fe, in phase with the model error $\epsilon$, is positive and at least half as big.

Control based on either model will not have integral action when the identifier is turned off. Integral action depends on updating the offset $e_0$. The effective integral time constant depends on the quantity of past history taken into account in calculating $\Theta$. Consequently it is likely to be significantly larger than optimal. On the other hand, integral action can be implemented explicitly in an outer-loop controller, such as:

$$\delta r_I = (r-y)/(2k-1), \tag{77}$$

without identifying $e_0$, if an incremental identification model is used to design the inner loop controller, $$\delta u = (C\, \delta r_I - G\, \delta y)/BF. \tag{78}$$

For an incremental model, the values of variables in $\Omega$ and $\Phi$ are changes, $\delta u$ and $\delta y$, from one time step to the next. If C were 1 in such a model, the autocorrelation function of the unmeasured disturbance noise would be a step instead of an impulse. The inner-loop set point $\delta r_I$ will be active, providing excitation to a mode (allowing identification of $\beta_0$ as well as $\alpha_0$), that would not be excited in a single loop structure, when the set point r is fixed.

A restricted complexity model has fewer modes than the process. Consequently its modeling error will have components resulting from structural mismatch as well as unmeasured disturbances. It may have substantially fewer parameters than an "exact" model. For example, the C and $\beta$ polynomials may be restricted to one term (C=1, $BF=\beta_0$) to be certain that they have no unstable zeros. Less past history is needed to reliably identify a small number of parameters, since fewer equations are needed to solve for fewer unknowns. Therefore a restricted complexity model can be updated more quickly, allowing it to better track a changing or nonlinear process. The identifier inputs, $\Phi$ and $\Omega$, should be filtered in order to make the process-model match best in the critical frequency range, where the open-loop absolute gain is near 1 for feedback control or near steady state for open-loop (or feedforward) control.

The implicit model form can be used to identify the delay time. The same $\Phi$ vector can be used for a number of predictor models, each predicting $\Omega$ a different number of time steps k into the future. If d is the largest possible value of k, the identifier equations can be time shifted to yield a common $\Phi$, [14]. At time step t:

$$\Omega_k\{t-d+k\} = \Phi\{t-d\}^T \Theta_k. \tag{79}$$

The prediction model with the largest $\beta_0$ coefficient can be chosen for the controller design, since this model indicates the greatest sensitivity of the controlled (predicted) variable to the present manipulated variable. Hence, it will result in the smallest controller gain. Furthermore, if more than one $\beta$ coefficient is identified, the model with the largest $\beta_0$ is most likely to have stable zeros. The model with the smallest prediction error is most likely the one with the smallest k, because of the autoregressive $\alpha$ terms, but this model would not necessarily be best for control. The identification filter time constants can be made proportional to the identified k, since k determines the closed loop performance and the critical frequency range.

Open-Loop Adaptation Using Continuous-Model Identification

A continuous (differential equation) model, in contrast to a difference equation model, is insensitive to the computing interval h, provided h is small. A restricted complexity identifier, for a process that includes delay, can be based on the method of moments, [15].

The Laplace transform $X\{s\}$ of each signal's derivative $x\{t\}$ can be expanded into an infinite series of moments:

$$X\{s\} = \int_0^\infty e^{-st} x\{t\}\, dt = M_0\{x\} - s M_1\{x\} + \ldots \tag{80}$$

Signal derivatives are used so that the moment integrals, for an isolated response, converge to near final values in the finite time $\tau$ from the disturbance start.

$$M_n\{x\} \approx \int_0^\tau t^n x\{t\}\, dt \approx \sum_{k=1}^{\tau/h} (k\,h)^n x\{k\}\, h. \tag{81}$$

The signal transforms are related to the model polynomials on a term by term basis. Choosing the B and D polynomials to be 1, and:

$$A\{s\} = a_0 - s\, a_1 + \ldots,$$
$$C\{s\} = c_0 - s\, c_1 + \ldots, \tag{82}$$

in the process equation:

$$u\{s\} = A\{s\}\, y\{s\} - C\{s\}\, e\{s\}, \tag{83}$$

gives:

$$\begin{aligned}M_0\{u\} &= a_0 M_0\{y\} - c_0 M_0\{e\}, \\ M_1\{u\} &= a_1 M_0\{y\} + a_0 M_1\{y\} - c_1 M_0\{e\} - c_0 M_1\{e\},\end{aligned} \tag{84}$$

For each additional equation there are one plus the number of measured disturbances (e) of additional unknown parameters. The projection algorithm can be used to find the smallest sum of weighted squared parameter changes that will satisfy the equations. Using projection, only those parameters weighting signals that are significantly active are updated. 84 expressed in vector and matrix form, for use in the projection algorithm, is:

$$\begin{aligned}\Omega &= \Phi^T \Theta, \\ \Omega^T &= [M_0\{u\}, M_1\{u\}, \ldots], \\ \Theta^T &= [a_0, a_1, \ldots, c_0, c_1, \ldots],\end{aligned} \tag{85}$$

$$\Phi^T = \begin{vmatrix} M_0\{y\}, 0, \ldots, -M_0\{e\}, 0, \ldots \\ M_1\{y\}, M_0\{y\}, \ldots, -M_1\{e\}, -M_0\{e\}, \ldots \end{vmatrix}.$$

The moment-projection approach is particularly suited for adapting feedforward gain and delay compensators, because the inputs need not be persistantly excited. Only two moments need be computed for each signal and two moment equations solved by projection. However, when signals are cycling or responses overlap, the moment integrals do not converge and the adaptation must be frozen. Since an adaptive feedback controller should be capable of stabilizing a stabilizable unstable loop, the moment-projection method is not suited for adaptation of a feedback controller.

Batch Parameter Identification Using Least Squares

A batch identifier calculates the model parameters that best fit a block of measured data. The start may be triggered when a significant disturbance is sensed and the end may follow the settling of an isolated response or the detection of a preset number of peaks for a cycling response. A least squares identifier finds the parameter vector $\Theta$ that minimizes the sum of squared prediction errors.

$$\epsilon\{t\} = \Omega\{t\} - \Phi\{t-k\}^T \Theta. \tag{86}$$

When the inverse of the matrix P exists, $$P^{-1} = \Sigma_i \Phi\{i-k\} \Phi\{i-k\}^T, \tag{87}$$

the result is given by:

$$\Theta = P \Sigma_i \Phi\{i-k\} \Omega\{i\}. \tag{88}$$

In order that $P^{-1}$ not be dominated by steady-state components of $\Phi$, it is customary to choose $\Phi$ and $\Omega$ to have nearly zero mean. If the means were completely removed $P^{-1}$ would be the covariance of $\Phi$ and P would be the covariance of $\Theta$. P also appears in the recursive algorithm of the next section.

For $\Theta$ to be calculable, $P^{-1}$ must not be singular. Non-singularity is difficult to guarantee. If any of the process inputs were quiescent over the identification period, $P^{-1}$ would be singular. This could happen if the controller output were limited or if the controller were in the manual mode. When P exists, the process is said to be persistently excited. It may be necessary to add otherwise undesirable probing signals to the normal process inputs to achieve persistent excitation.

Recursive Parameter Identification Using The Kalman Filter

The Kalman filter [16] provides a one step ahead prediction of the parameter vector $\Theta$ (treated as a state variable) in a model equation:

$$\Theta\{t\} = \Theta\{t-h\} + v\{t\}, \tag{89}$$

modified by observations of a related measured variable scalar (or vector), $\Omega$.

$$\Omega\{t\} = \Phi\{t-k\}^T \Theta\{t\} + \epsilon\{t\}. \tag{90}$$

The model equation 89 has a zero-mean white Gaussian noise source vector v with covariance matrix Q, which causes $\Theta$ to randomly change. The scalar (or vector) observation equation has a zero-mean white Gaussian noise source scalar (or vector) $\epsilon$, with covariance value (or matrix) R, in this case uncorrelated with v. Depending on which noise source dominates, the Kalman filter weights the other equation more heavily.

$$\Theta\{t\} = \Theta\{t-1\} + K\{t\} (\Omega\{t\} - \Phi\{t-k\}^T \Theta\{t-1\}). \tag{91}$$

$\Theta$ is the predicted parameter vector and K is the time varying Kalman gain vector (or matrix) which can be precalculated using:

$$K\{t\} = P\{t-1\} \Phi\{t-k\} (R + \Phi\{t-k\}^T P\{t-1\} \Phi\{t-k\})^{-1}, \tag{92}$$

$$P\{t\} = (I - K\{t\} \Phi\{t-k\}^T) P\{t-1\} + Q. \tag{93}$$

When Q is a null matrix, this algorithm is the recursive least squares algorithm, finding the parameter set $\Theta$ that minimizes the sum of squared model errors, equally weighted over all past observations. As time progresses the P matrix and gain K approach zero, so that eventually each new observation has almost no effect on the identified $\Theta$. Therefore an unmodified recursive least squares solver does not allow a model to adapt to a time varying or nonlinear process.

Whereas R tends to reduce K and P by a factor each iteration, Q increases P by a fixed increment. Therefore Q has a relatively greater influence when P is small and vice versa when P is large. Thus when neither R nor Q is zero, P tends toward a mid-range value. As a result, the Kalman gain K remains finite, so that the most recent observations affect the identified $\Theta$, allowing the model to adapt to a time varying or nonlinear process. In effect this method, in contrast to the variable forgetting factor approach, weights a different quantity of past history for each variable $\Phi_i$, depending on its activity and the ratio of $Q_{ii}$ to R.

When both R and Q are zero, the predictor becomes an orthogonal projection algorithm. $\Theta$ converges in a determinate number of iterations to a fixed vector, provided each of these observations contains some independent information. The number of iterations is the number of parameters in $\Theta$ divided by the number of components in $\Omega$.

Projection

If P is not updated and R is zero, the Kalman filter algorithm performs a projection each iteration, finding the smallest set of weighted squared parameter (state variable) changes that satisfy the model equations exactly. The weighting matrix P is the a priori covariance of $\Theta$.

REFERENCES

1. Astrom, K. J., and B. Wittenmark, "Computer Controlled Systems", Prentice-Hall (1984).
2. Takahshi, Y., M. J. Rabins, and D. M. Auslander, "Control", Addison-Wesley (1970).
3. Franklin, G. F., and J. D. Powell, "Digital Control" Addison-Wesley (1980).
4. Zafiriou, E., "On the Robustness of Model Predictive Controllers", Chemical Process Control - CPCIV, Cache AICHE. (1991).
5. Hansen, P. D., "Recovery from Controller Bounding", ASME Winter Annual Meeting (1987).
6. Shinskey, F. G. , "Putting Controllers to the Test", Chemical Engineering (Dec. 1990) 96–106.
7. Slotine, J-J. E. and W. Li, "Applied Nonlinear Control", Prentice-Hall (1991).
8. Shinskey, F. G. , "Process Control Systems", 3rd ed., McGraw-Hill (1988).
9. Bristol, E. H., "On a New Measure of Interaction for Multivariable Process Control", IEEE Trans. Atom. Control (Jan. 1966).
10. Ricker, N. L., "Model Predictive Control: State of The Art", Chemical Process Control - CPCIV, Cache AICHE. (1991).
11. Kraus, T. W, and T. J. Myron, "Self-Tuning PID Controller Uses Pattern Recognition Approach", Control Engineering (June 1984).
12. Hansen, P. D. , "Recent Advances in Adaptive Control", 40th Chemical Engineering Conference, Halifax, Nova Scotia (July 1990).
13. Ljung, L. and T. Soderstrom, "Theory and Practice of Recursive Identification", MIT Press (1982).

14. Hansen, P. D. and Kraus, T. W., "Expert System and Model-Based Self-Tuning Controllers", Standard Handbook of Industrial Automation, D. M. Considine, Ed., Chapman And Hall, N.Y., 216 (1986).
15. Bristol, E. H. and P. D. Hansen, "Moment Projection Feedforward Control Adaptation", Proc. of 1987 American Control Conf., 1755 (1987).
16. Goodwin, G. C. and K. S. Sin, "Adaptive Filtering, Prediction, and Control", Prentice-Hall (1983).

What is claimed is:

1. Process control apparatus for attaining a selected closed-loop response of a control system, said apparatus comprising
   an outer-control loop having
      monitoring means, coupled to a controlled variable signal representative of a first characteristic of a process having an open-loop response, and to an operation control signal representative of a preselected value for said first characteristic of said process, said monitoring means for generating a difference signal representative of the difference between a signal characteristic of said controlled variable signal and said operation control signal, and
      an outer-control element coupled to said monitoring means and having means for storing at least one control parameter being representative of a control parameter of said process control apparatus, and having means for generating an outer control signal as a function of said control parameter and of said difference signal, for manipulating said first characteristic of said process toward said preselected value,
   an inner-control loop having
      an inner-control element coupled to said controlled variable signal and having means for storing one or more control parameters representative of control parameters of said process control apparatus and having means for generating an inner control signal as a function of a said control parameter and of said controlled variable signal, for manipulating said first characteristic of said process toward said preselected value, and
      summation means, coupled to said outer-control element and to said inner control element, for summing said inner-control signal and said outer-control signal to generate a manipulated variable signal for manipulating said first characteristic of said process toward said preselected value, and
   automatic tuning means for modifying said control parameters, said tuning means having means for storing at least one preselected closed-loop transfer function of said outer-control loop, and having means for storing at least one preselected closed-loop transfer function for said inner-control loop, and having means for storing at least one process model representative of a said open-loop process response, and having means for generating said control parameters as a function of said process model, and said preselected transfer functions, for tuning said inner-control loop and said outer-control to achieve substantially said selected closed-loop response.

2. Process control apparatus according to claim 1, having means for selecting one of said stored transfer functions according to a user-selected design criteria and wherein said design criteria for said first inner-control loop, represents the substantial elimination of derivative action for an open-loop process response representative of a pure delay.

3. Process control apparatus according to claim 1, having means for selecting one of said stored transfer functions according to a user-selected design criteria and wherein said design criteria for said first outer-control loop, represents the substantial elimination of overshoot of said controlled variable signal.

4. Process control apparatus according to claim 1 wherein said means for storing preselected transfer functions includes means for storing at least one transfer function being representative of a pure delay.

5. Process control apparatus according to claim 1 wherein said means for storing preselected transfer functions includes means for storing at least one transfer function being representative of a butterworth filter.

6. Process control apparatus according to claim 1 wherein said means for storing preselected transfer functions includes means for storing at least one transfer function being representative of a plurality of equal lag delays.

7. Process control apparatus according to claim 6 wherein said tuning has means for storing at least four process parameters and has means for generating said one or more control parameters as a function of said four process parameters and said transfer function being representative of said plurality of equal lag delays.

8. Process control apparatus according to claim 1 wherein said control parameters include a first control parameter, D, being representative of the derivative time of a control system, and said tuning means includes means for adjusting said derivative time control parameter according to a predetermined ratio of said stored process model to adjust derivative action within the control system.

9. Process control apparatus according to claim 1 for use within a non-interacting control system wherein said control parameters include a first non-interacting control parameter, P, being representative of the proportional band of the control system, and a second non-interacting control parameter, I, being representative of the integral time of the control system, and a third non-interacting control parameter, D, being representative of the derivative time of the control system,
   said tuning means further comprising
      means for converting said proportional, said derivative and said integral non-interacting control parameters into interacting control parameters representative of a proportional, a derivative and an integral control parameter for a corresponding interacting control system.

10. Process control apparatus according to claim 1, further including filter means for filtering said operation control signal, said filter means having a time constant $\tau_f$ being determined according to a known function of said at least one control parameters.

11. Process control apparatus according to claim 1, further including means for storing a control parameter, $\alpha$, being representative of the lead-lag ratio of said process control means and said tuning means for generating said one or more control parameters has means for generating said led-lag ratio as a function of said at least one stored control parameter.

12. Process control apparatus for attaining a selected closed-loop response of a control system, said apparatus comprising
   process control means having means for monitoring a controlled variable signal being representative of a first characteristic of a process having an open-loop response, means for monitoring an operation control signal of said control system, said operation control signal being representative of a preselected value for said first characteristic of said process, means for storing at least one parameter, said parameter being representative of a control parameter of said control system, means for generating a manipulated variable signal as a function of at least said one control parameter, of said controlled variable signal and of said operation control signal, for manipulating said first characteristic toward said preselected value, and, automatic tuning means for generating one or more control parameters, said tuning means includes identification means for identifying a process model being representative of the open-loop process response, said process model having at least one variable parameter, said identification means having means for storing at least one process model, having means for selecting one of said stored process models and having means for selecting said at least one model parameter, means for determining at least one weighting coefficient of a corresponding frequency component of said open-loop process response, said at least one weighting coefficient being determined according to a known function of said at least one model parameter, means for storing at least one preselected closed loop system response, and, means for generating said one or more control parameters as a function of said weighting coefficients, wherein said function is determined by a selected one of said stored system responses.

13. Process control apparatus according to claim 12, wherein said tuning means includes actuator means for actuating said open-loop process, said actuator means has means for storing at least one predetermined signal pattern, and means for generating said manipulated variable signal according to said predetermined signal pattern for application to said process to generate said controlled variable signal being representative of said open-loop process response to said predetermined signal pattern.

14. Process control apparatus according to claim 13, wherein said means for generating said manipulated variable signal includes means for storing at least one predetermined threshold value being representative of a first characteristic of said controlled variable signal, means for measuring said first characteristic of said controlled variable signal and means for measuring a second characteristic of said controlled variable signal, and, wherein said means for generating said manipulated variable signal according to said predetermined signal pattern further includes means for generating said manipulated variable signal responsive to said first characteristic and said second characteristic of said controlled variable signal and said threshold value.

15. Process control apparatus according to claim 12, wherein said means for selecting one of said process models has means for measuring at least a first and a second characteristic of said controlled variable signal, and, means for determining from said first and said second characteristics, pattern features of said controlled variable signal being representative of one of said stored process models and being representative of said parameters of said process model.

16. Process control apparatus according to claim 15, wherein said means for determining pattern features of said controlled signal includes filter means for selecting predetermined frequencies of said controlled variable signal.

17. Process control apparatus according to claim 15, wherein said means for measuring a first characteristic and a second characteristic of said controlled variable signal has means for measuring the amplitude of said controlled variable signal.

18. Process control apparatus according to claim 15, wherein said means for measuring a first characteristic and a second characteristic of said controlled variable signal has means for measuring time intervals between preselected signal events.

19. Process control apparatus according to claim 18, wherein said preselected signal events include, the occurrence of local extrema, and the occurrence of zero-crossings.

20. Process control apparatus according to claim 15, wherein said means for measuring a first and a second characteristic of said controlled variable signal has means for measuring the amplitude of said controlled variable signal, and has means for storing at least one user-selected threshold value, each value being representative of a predetermined amplitude of said controlled variable signal.

21. Process control apparatus according to claim 20, wherein said means for measuring a first and a second characteristic of said controlled variable signal has means for measuring time intervals between preselected signal events, wherein said preselected signal events include, the occurrence of local extrema, the occurrence of zero-crossings and the occurrence of threshold crossings.

22. Process control apparatus for attaining a selected closed-loop response of a control system, said apparatus comprising process control means for monitoring a controlled variable signal representative of a first characteristic of a process having an open-loop response, means for monitoring an operation control signal of said control system, said operation control signal representative of a preselected value for said first characteristic of said process, means for storing at least one control parameter representative of a control parameter of said process control apparatus, means for generating a manipulated variable signal as a function of said control parameter, of said controlled variable signal and of said operation control signal, for manipulating said first characteristic toward said preselected value, identification means for identifying a process model having at least one variable process parameter and being representative of said open-loop process response, including means for storing a first characteristic and a second characteristic of said process model, said first and said second characteristics being representative of a process type and being determined according to a ratio of said control parameters, measurement means for measuring amplitude values of said controlled variable signal to characterize at least two pattern features representative of a first characteristic of the closed loop system, means for generating said variable process parameters of said process model according to a known function of said first and said second process type characteristics and said first characteristic of said closed-loop system, means for determining at least one weighting coefficient of a corresponding frequency component of said open-loop process response, said weighting coefficient being determined according to a known function of said model parameter, means for storing at least one preselected closed loop system response, and, automatic tuning means for generating said control parameters as a function of said weighting coefficients, wherein said function is determined according to a selected one of said stored closed loop system responses.

23. Process control apparatus according to claim 22, wherein said measurement means has means for measuring amplitude values being representative of said local extrema of said controlled variable signal.

24. Process control apparatus according to claim 22, wherein a first one of said two or more pattern features is representative of the period of said controlled variable signal and a second one of said at least two pattern features is representative of said attenuation of said controlled variable signal.

* * * * *